United States Patent
Lind et al.

(10) Patent No.: US 11,517,913 B2
(45) Date of Patent: Dec. 6, 2022

(54) LOW ENERGY PROCESS FOR METAL EXTRACTION

(71) Applicant: GOLDCORP INC., Denver, CO (US)

(72) Inventors: Peter Lind, Vancouver (CA); Simon Hille, Vancouver (CA); Marcus Tomlinson, Vancouver (CA)

(73) Assignee: GOLDCORP INC., Denver, CO (US)

( * ) Notice: Subject to any disclaimer, the term of this patent is extended or adjusted under 35 U.S.C. 154(b) by 71 days.

(21) Appl. No.: 16/766,381

(22) PCT Filed: Dec. 3, 2018

(86) PCT No.: PCT/CA2018/051541
§ 371 (c)(1),
(2) Date: May 22, 2020

(87) PCT Pub. No.: WO2019/109173
PCT Pub. Date: Jun. 13, 2019

(65) Prior Publication Data
US 2020/0376497 A1    Dec. 3, 2020

Related U.S. Application Data

(60) Provisional application No. 62/594,393, filed on Dec. 4, 2017.

(51) Int. Cl.
*B02C 21/00*     (2006.01)
*B02C 23/14*     (2006.01)
(Continued)

(52) U.S. Cl.
CPC ............ *B02C 21/007* (2013.01); *B02C 23/14* (2013.01); *C22B 1/00* (2013.01); *C22B 11/00* (2013.01)

(58) Field of Classification Search
CPC ....... B02C 21/007; B02C 21/00; B02C 23/14; B02C 23/08; B02C 23/38; C22B 1/00; C22B 11/00; B07B 15/00; B07B 9/00
(Continued)

(56) References Cited

U.S. PATENT DOCUMENTS 2,743,059 A * 4/1956 Reddy ................... B02C 21/00
                                                                      241/4
3,497,142 A * 2/1970 Nelson .................. B02C 21/007
                                                                    241/24.1
(Continued)

FOREIGN PATENT DOCUMENTS

AU      2009213831 B2    2/2009
CA         2641626 A1    9/2007
(Continued)

OTHER PUBLICATIONS

D. J. Acuff, Innovative design for energy-efficient grinding, Randol Gold Forum—Beaver Creek '93, Randol International Ltd, Golden, 1993, 99-100.
(Continued)

*Primary Examiner* — Jessica Cahill
*Assistant Examiner* — Mohammed S. Alawadi
(74) *Attorney, Agent, or Firm* — Ohlandt, Greeley, Ruggiero and Perle, LLP

(57) ABSTRACT

Methods and systems for preparing ore for precious metal extraction is provided. For example, a method comprises crushing ore; grinding the crushed ore; screening the ground ore to separate ore particles into a first group of large ore particles and a first group of small ore particles; crushing the first group of large ore particles; screening the crushed ore to separate into a second group of large ore particles and a second group of small ore particles; separating the second group of small ore particles from the screen into a third (Continued)

group of large particles and a third group of small particles; milling the third group of large ore particles; separating milled particles into a fourth group of large particles and a fourth group of small particles; and sending the third and fourth group of small particles for further metal extraction processing.

32 Claims, 7 Drawing Sheets

(51) Int. Cl.
    *C22B 1/00*     (2006.01)
    *C22B 11/00*     (2006.01)
    *B02C 23/08*     (2006.01)
    *B07B 15/00*     (2006.01)
    *B07B 9/00*     (2006.01)

(58) Field of Classification Search
    USPC ............................................ 241/152.2
    See application file for complete search history.

(56) References Cited

U.S. PATENT DOCUMENTS

| | | | |
|---|---|---|---|
| 4,671,464 A | 6/1987 | Karra et al. | |
| 4,732,606 A * | 3/1988 | Kobele | C22B 21/0023 |
| | | | 241/20 |
| 5,115,989 A | 5/1992 | Poeschl | |
| 5,338,337 A * | 8/1994 | Johnson | B03B 9/00 |
| | | | 75/654 |
| 5,544,821 A | 8/1996 | Gupta et al. | |
| 2005/0145729 A1 | 7/2005 | Stachowski et al. | |
| 2008/0184849 A1* | 8/2008 | Fiset | C22B 3/46 |
| | | | 75/721 |
| 2009/0189597 A1 | 7/2009 | Lagerberg et al. | |
| 2010/0193618 A1 | 8/2010 | Lewis-Gray | |
| 2015/0258576 A1 | 9/2015 | Hagemeier et al. | |
| 2019/0390298 A1* | 12/2019 | Rothman | B03D 1/1425 |
| 2020/0078795 A1* | 3/2020 | Rothman | B03C 1/30 |
| 2020/0376497 A1 | 12/2020 | Lind et al. | |

FOREIGN PATENT DOCUMENTS

| | | |
|---|---|---|
| CA | 2641626 C | 4/2015 |
| CN | 200995151 Y | 12/2007 |
| CN | 100478077 C | 4/2009 |
| CN | 201505564 U | 6/2010 |
| CN | 101596483 B | 8/2011 |
| CN | 102389852 A | 3/2012 |
| CN | 202290240 U | 7/2012 |
| CN | 202356149 U | 8/2012 |
| CN | 202725260 U | 2/2013 |
| CN | 202876918 U | 4/2013 |
| CN | 103934084 A | 7/2014 |
| CN | 103934088 A | 7/2014 |
| CN | 203678434 U | 7/2014 |
| CN | 203678502 U | 7/2014 |
| CN | 203678511 U | 7/2014 |
| CN | 203853154 U | 10/2014 |
| CN | 203917150 U | 11/2014 |
| CN | 103736588 B | 12/2014 |
| CN | 204034773 U | 12/2014 |
| CN | 204182451 U | 3/2015 |
| CN | 204352945 U | 5/2015 |
| CN | 103706429 B | 6/2015 |
| CN | 204486007 U | 7/2015 |
| CN | 204544758 U | 8/2015 |
| CN | 204544760 U | 8/2015 |
| CN | 104941758 A | 9/2015 |
| CN | 204672334 U | 9/2015 |
| CN | 204746500 U | 11/2015 |
| CN | 204768947 U | 11/2015 |
| CN | 204768976 U | 11/2015 |
| CN | 103934077 B | 12/2015 |
| CN | 204816681 U | 12/2015 |
| CN | 204841874 U | 12/2015 |
| CN | 204865983 U | 12/2015 |
| CN | 204892016 U | 12/2015 |
| CN | 204911734 U | 12/2015 |
| CN | 105344417 A | 2/2016 |
| CN | 205361497 U | 7/2016 |
| CN | 103878904 B | 8/2016 |
| CN | 205570463 U | 9/2016 |
| CN | 205700832 U | 11/2016 |
| CN | 205887105 U | 1/2017 |
| CN | 206184570 U | 5/2017 |
| CN | 106861812 A | 6/2017 |
| CN | 105107571 B | 3/2018 |
| CN | 105080671 B | 6/2018 |
| CN | 104874457 B | 11/2019 |
| DE | 19514971 A1 | 11/1995 |
| WO | 2008147420 A1 | 12/2008 |

OTHER PUBLICATIONS

G. E. Agar and P. Somasundaran, Rationalization of energy. Particle size relations in comminution, Proceedings of the Tenth International Mineral Processing Congress, ed. M.J. Jones, Institution Mining Metallurgy, London, 1974, 3-21.

A. Apling and M. Bwalya, Evaluating high pressure milling for liberation enhancement and energy saving, Minerals Engineering, 10(9), 1013-1022 (1997).

A. M. Aziz and M. Mosser, Software modeling cuts SAG energy consumption at Cortez Gold, Engineering Mining J., 2007(5), 44-47.

C. Bailey, G. Lane, S. Morrell, and P. Staples. "What can go wrong in comminution circuit design." In Proceedings of the 10th Mill Operatirs' Conference, Adelaide, SA. 2009.

G. R. Ballantyne, W. Peukert and M. S. Powell, Size specific energy (SSE)—Energy required to generate minus 75 micron material, International J. Mineral Processing, 136, 2-6 (2015).

G. R. Ballantyne and M. S. Powell, Benchmarking comminution energy consumption for the processing of copper and gold ores, Minerals Engineering, 65, 109-114 (2014).

G. R. Ballantyne, M. S. Powell and M. Tiang, Proportion of energy attributable to comminution, Proceedings 11th Mill Operators' Conference 2012, Australasian Institute Mining Metallurgy, Melbourne, 2012, 25-30.

G. R. Ballantyne, Marko Hilden, and M. S. Powell. "Early rejection of gangue—How much energy will it cost to save energy?." Comminution 12 (2012).

K. Barns, G. Lane, K. Osten and N. Scagliotta, Benchmarking energy efficiency—A case study of Macraes Gold Mine, Metallurgical Plant Design and Operating Strategies, Perth, 2004.

Robin J. Batterham "Major trends in the mineral processing industry." BHM Berg-und Hüttenmännische Monatshefte 158, 2 (2013): 42-46.

R. Bearman, S. Munro and C. M. Evertsson, Crushers—An essential part of energy efficient comminution circuits, Metallurgical Plant Design and Operating Strategies (MetPlant 2011), Australasian Institute Mining Metallurgy, Melbourne, 2011, 66-85.

M. Becker, A. Kwade and J. Schwedes, Stress intensity in stirred media mills and its effect on specific energy requirement. International J. Mineral Processing, 61(3), 189-208 (2001).

L. Blecher and J. Schwedes, Energy distribution and particle trajectory in a grinding chamber in a stirred ball mill, International J. Mineral Processing, 44-45, 617-627 (1996).

A. Bouajila and S. Makni, Toward the improvement of primary grinding productivity and energy consumption efficiency: Multivariate data analysis for the classification of SAG/FAG mill behaviour, International Autogenous and Semiautogenous Grinding Technology 2001, ed. D.J. Barratt, M. J. Allan and A. L. Mular, University British Columbia, Vancouver, vol. IV, 2001, 165-179.

F. S. Bourgeois, R. P. King and J. A. Herbst, Low-impact-energy single-particle fracture, Comminution—Theory and Practice, ed. S. K. Kawatra, SME-AIME, Littleton, 1992, 99-108.

(56) References Cited

OTHER PUBLICATIONS

S. Breitung-Faes and A. Kwade, Prediction of energy effective grinding conditions, Minerals Engineering, 43-44, 35-43 (2013).
M. Brissette, Energy savings and improved recovery with small grinding media, Proceedings Annual Meeting Canadian Mineral Processors, Canadian Institute Mining Metallurgy, Montreal, 2009, 587-608.
M. Brissette, Energy savings and technology comparison using small grinding media, XXV International Mineral Processing Congress—IMPC 2010, Australasian Institute Mining Metallurgy, Melbourne, 2010, 581-589.
M. Bueno and G. Lane, Key drivers of energy and cost efficiency in autogenous/semi-autogenous grinding circuits, 11th Mill Operators' Conference 2012, Hobart, 2012.
B. Burford, Concentrating minerals and improving energy efficiency—A new approach, Bulletin Australasian Institute Mining Metallurgy, 2007(7), 40-43.
B. D. Burford and E. Niva, Comparing energy efficiency in grinding mills, Metallurgical Plant Design and Operating Strategies (MetPlant 2008), Australasian Institute Mining Metallurgy, Melbourne, 2008, 45-64.
H. Choi, W. Lee, D. U. Kim, S. Kumar, S. S. Kim, H. S. Chung, J .H. Kim and Y. C. Ahn, Effect of grinding aids on the grinding energy consumed during grinding of calcite in a stirred ball mill, Minerals Engineering, 23(1), 54-57 (2010).
H. Choi and L. Wang, A quantitative study of grinding characteristics on particle size and grinding consumption energy by stirred ball mill, Han'guk Chaelyo Hakhoechi, 17(10), 532-537 (2007).
T. Cienski and D. Doyle, Energy conservation in the comminution of industrial minerals, Annual SME-AIME Meeting, Salt Lake City, 1990.
T. Cienski and D. Doyle, Energy conservation in the comminution of industrial minerals, Canadian Institute Mining Metallurgy Bulletin, 85(958), 101-109 (1992).
P. W. Cleary, P. Owen and R. Morrison, The role of advanced DEM based modelling tools in increasing comminution energy efficiency, Green Processing 2004: Second International Conference on the Sustainable Processing of Minerals, Australasian Institute Mining Metallurgy, Melbourne, 2004, 149-161.
P. W. Cleary, M. D. Sinnott and G. G. Pereira, Computational prediction of performance for a full scale Isamill: Part 1—Media motion and energy utilisation in a dry mill, Minerals Engineering, 79, 220-238 (2015).
W. Conger and G. Schick, Industrial SAG media consumption study—Definition of consumption and relationship with SAG specific grinding energy, Annual SME-AIME Meeting, Salt Lake City, 2014.
A. Crawford, X. Zheng and P. Manton, Incorporation of pebble crusher specific energy measurement of the optimisation of SABC grinding circuit throughput at Telfer, Tenth Mill Operators' Conference, Australasian Institute Mining Metallurgy, Melbourne, 2009, 305-314.
J. A. Curry, M.J.L. Ismay and G. J. Jameson, Mine operating costs and the potential impacts of energy and grinding, Minerals Engineering, 56, 70-80 (2014).
D. A. Dahlstrom and W .P. Kam, Potential energy savings in comminution by two-stage classification, International J. Mineral Processing, 22(1/4), 239-250 (1988).
D. A. Dahlstrom and W. P. Kam, Classification for energy's sake, Comminution—Theory and Practice, ed. S. K. Kawatra, SME-AIME, Littleton, 1992, 249-260.
M. Daniel, G. Lane, and E. McLean. "Efficiency, economics, energy and emissions—emerging criteria for comminution circuit decision making." Proceeding of XXV International Mineral Processing Congress. 2010.
N. Djordjevic, Influence of charge size distribution on net-power draw of tumbling mill based on DEM modelling, Minerals Engineering, 18(3), 375-378 (2005).

N. Djordjevic, Improvement of energy efficiency of rock comminution through reduction of thermal losses, Minerals Engineering, 23(15), 1237-1244 (2010).
A. G. Doll, A simple estimation method of materials handling: Specific energy consumption in HPGR circuits, Proceedings 47th Annual Meeting Canadian Mineral Processors, P. Blatter and J. Zinck, Canadian Institute Mining Metallurgy, Montreal, 2015, 3-12.
K. Duffy, W., Valery, A. Jankovic, & P. Holtham, (Nov. 2015). Resource Efficient Mining Processes of Tomorrow. AusIMM 3rd International Future Mining Conference, Sydney, Australia, Nov. 4-6, 2015.
Bianca Foggiatto, "Modelling and simulation approaches for exploiting multi-component characteristics of ores in mineral processing circuits." (2017).
R. Fruit and A. Donahue, Putting destructive vibratory energy to productive use in grinding, Engineering Mining J., 215 (2), 66-68 (2014).
D. W. Fuerstenau, A. Z. M. Abouzeid and P. C. Kapur, Energy split and kinetics of ball mill grinding of mixture feeds in heterogeneous environment, Powder Technology, 72(2), 105-111 (1992).
D. W. Fuerstenau and P. C. Kapur, Newer energy-efficient approach to particle production by comminution, Powder Technology, 82(1), 51-57 (1995).
D. W. Fuerstenau, P. C. Kapur and O. Gutsche, Comminution of single particles in a rigidly-mounted roll mill. Part I: Mill torque model and energy investment. Powder Technology, 76(3), 253-262 (1993).
D. W. Fuerstenau, P. C. Kapur, K. Schoenert and M. Marktscheffel, Comparison of energy consumption in the breakage of single particles in a rigidly mounted roll mill with ball mill grinding, International J. Mineral Processing, 28 (1/2), 109-125 (1990).
D. W. Fuerstenau, A. Shukla and P. C. Kapur, Energy consumption and product size distributions in choke-fed, high-compression roll mills, International J. Mineral Processing, 32(1/2), 59-79 (1991).
D. W. Fuerstenau and J. Vazquez-Favela, On assessing and enhancing the energy efficiency of comminution processes, Minerals Metallurgical Processing, 14(1), 41-48 (1997).
D. W. Fuerstenau and K. S. Venkataraman, The comminution of multi-component feeds under batch and locked-cycle conditions: Kinetics, simulation and energy distribution. International J. Mineral Processing, 22(1/4), 105-118 (1988).
G. A. Graves and T. Boehm, Mill media considerations for high energy mills, Minerals Engineering, 20(4), 342-347 (2007).
M. Grujic and D. Salatic, Energy optimization in the comminution processes, Mineral Processing on the Verge of the 21st Century, ed. G. Ozbayoglu, C. Hosten, M. Umit Atalay, C. Hicyilmaz and A. Ihsan Aral, Balkema, Rotterdam, 2000, 27-30.
M. Guma, H. von Blottnitz, and J. L. Broadhurst. "A Systems Approach for the Application of Eco-Efficiency Indicators for Process Design in the Minerals Industry." In SDIMI Conference Gold Coast, QLD, pp. 301-312. 2009.
International Preliminary Report on Patentability dated Jun. 18, 2020 from corresponding International Patent Application No. PCT/CA2018/051541, 6 pages.
Mondli Guma, Developing minerals beneficiation flowsheets for eco-efficiency: a systems approach. Diss. University of Cape Town, 2010.
O. Gutsche, P. C. Kapur and D. W. Fuerstenau, Comminution of single particles in a rigidly-mounted roll mill. Part 2: Product size distribution and energy utilization, Powder Technology, 76(3), 263-270 (1993).
Max Hesse, Oleg Popov, and Holger Lieberwirth. "Increasing efficiency by selective comminution." Minerals Engineering 103 (2017): 112-126.
L. Hougen, Energy saving by modification of the vibration mill, Powder Technology, 82(2), 191-196 (1995).
D. D. Howat and L. A. Vermeulen, The design of linings for rotary mills: A major factor in the throughput and consumption of energy and metal, J. South African Institute Mining Metallurgy, 86(7), 251-259 (1986).
A. Jankovic, H. Dunbar and R. Mehta, Relationships between comminution energy and product from a magnetite ore, J. South African Institute Mining Metallurgy, 110(3), 141-146 (2010).

(56) References Cited

OTHER PUBLICATIONS

A. Jankovic and W. Valery, The impact of classification on the energy efficiency of grinding circuits—The hidden opportunity. Proceedings 11th Mill Operators' Conference 2012, Australasian Institute Mining Metallurgy, Melbourne, 2012, 65-69.
E. G. Joe, Energy consumption in Canadian mills, Canadian Institute Mining Metallurgy Bulletin, 72(806), 147-151 (1979).
E. Kapakyulu and M.H. Moys, Modeling of energy loss to the environment from a grinding mill. Part I: Motivation, literature survey and pilot plant measurements, Minerals Engineering, 20(7), 646-652 (2007).
E. Kapakyulu and M. H. Moys, Modeling of energy loss to the environment from a grinding mill. Part II: Modeling the overall heat transfer coefficient, Minerals Engineering, 20(7), 653-661 (2007).
P. C. Kapur and D. W. Fuerstenau, Energy-size reductions laws revisited, International J. Mineral Processing, 20(1/2), 45-57 (1987).
P. C. Kapur, O. Gutsche and D. W. Fuerstenau, Comminution of single particles in a rigidly-mounted roll mill. Part 3: Particle inter-action and energy dissipation, Powder Technology, 76(3), 271-276 (1993).
P. C. Kapur, K. Schoenert and D. W. Fuerstenau, Energy-size relationship for breakage of single particles in a rigidly mounted roll mill, International J Mineral Processing, 29(3/4), 221-233 (1990).
S. K. Kawatra and T. C. Eisele, Influence of temperature on the energy efficiency of an industrial circuit processing iron ore, Minerals Metallurgical Processing, 8(1), 32-37 (1991).
A. S. Kheifets and I. J. Lin, Energy transformations in a planetary grinding mill. Part 1. General treatment and model design, International J Mineral Processing, 47(1/2), 1-19 (1996).
A. S. Kheifets and I. J. Lin, Energy transformations in a planetary grinding mill. Part 2. Model verification, International J. Mineral Processing, 47(1/2), 21-31 (1996).
R. P. King, Establishing the energy efficiency of a ball mill, Annual SME-AIME Meeting, Denver, 1997.
R. P. King and F. Bourgeois, Measurement of fracture energy during single-particle fracture, Minerals Engineering, 6(4), 353-367 (1993).
R. P. King, F. S. Bourgeois and J. A. Herbst, Low impact-energy single-particle fracture, Annual SME-AIME Meeting, Phoenix, 1992.
T. Kojovic, T.J. Napier-Munn and J. S. Andersen, Modelling of cone and impact crushers using laboratory-determined energy-breakage functions, Annual SME-AIME Meeting, Denver, 1997.
A. Kumar, V. V. Ramaro, B. P. Kamath, K. P. Ray and K .R. Kini, Energy reduction in ore comminution through microwave, Sohn International Symposium: Advanced Processing of Metals and Materials: vol. 4: New, Improved and Existing Technologies, ed. F. Kongoli and R.G. Reddy, TMS-AIME, Warrendale, 2006, 481-489.
A. Kwade, Specific energy consumption, stress energy, and power draw of stirred media mills and their effect on the production rate. Advances in Comminution, ed. S.K. Kawatra, SME-AIME, Littleton, 2006, 99-114.
S. Latchireddi, Improving autogenous/semi-autogenous grinding performance and energy efficiency with optimised pulp lifter design, Tenth Mill Operators' Conference, Australasian Institute Mining Metallurgy, Melbourne, 2009, 89-93.
S. Latchireddi and E. Faria, Achievement of high energy efficiency in grinding mills at Santa Rita, Proceedings Annual Canadian Mineral Processors Operators Conference, Canadian Institute Mining Metallurgy, Montreal, 2013, 97-110.
K. Leung, R. D. Morrison and W. J. Whiten, An energy based ore specific model for autogenous and semi-autogenous grinding, Copper 87: Economics, Metallurgy and Process Control, ed. A. Mular, G. Gonzalez and C. Barahona, Universidad De Chile, Santiago, 1988, 71-85.
M. Y. Levesque and D. L. Millar, The link between operational practices and specific energy consumption in metal ore milling plants—Ontario experiences, Minerals Engineering, 71, 146-158 (2015).
G. Li and X. Xu, Experimental investigation of the energy-size reduction relationship in comminution using fractal theory, Minerals Engineering, 6(2), 163-172 (1993).
L. Lim, W. Voigt and K. R. Weller, Product size distribution and energy expenditure in grinding minerals and ores in high pressure rolls, International J. Mineral Processing, 44-45, 539-559 (1996).
Y. C. Lo and G. A. Goller, Increasing energy efficiency of grinding media through microscale comminution studies, XIX International Mineral Processing Congress, San Francisco, 1995.
N. M. Magdalinovic, Calculation of energy required for grinding in a ball mill, International J. Mineral Processing, 25(1/2), 41-46 (1989).
K. G. Markkola, J. Soto, G. Yanez and H. Jimenez, SABC circuit energy consumption optimisation, Copper 2007—vol. II—Mineral Processing, ed. R. Del Villar, J. E. Nesset, C. O. Gomez and A. W. Stradling, Canadian Institute Mining Metallurgy, Montreal, 2007, 301-3112.
J. M. Menendez Aguado, A. L. Coello Velazquez, O. N. Tijonov and M. A. Rodriguez Diaz, Implementation of energy sustainability concepts during the comminution process of the Punta Gorda nickel ore plant (Cuba), Powder Technology, 170(3), 153-157 (2006).
S. Morrell, Predicting the specific energy of autogenous and semi-autogenous mills from small diameter drill core samples, Minerals Engineering, 17(3), 447-451 (2004).
S. Morrell, An alternative energy-size relationship to that proposed by Bond for the design and optimisation of grinding circuits, International J. Mineral Processing, 74(1/2), 133-141 (2004).
S. Morrell, AG/SAG mill circuit grinding energy requirement—How to predict it from small-diameter drill core samples using SMC test, Advances in Comminution, ed. S. K. Kawatra, SME-AIME, Littleton, 2006, 115-128.
S. Morrell, A method for predicting the specific energy requirement of comminution circuits and assessing their specific utilisation efficiency, Minerals Engineering, 21(3), 224-233 (2008).
S. Morrell, Predicting the overall specific energy requirement of crushing, high pressure grinding roll and tumbling mill circuits, Minerals Engineering, 22(6), 544-549 (2009).
S. Morrell, Predicting the specific energy required for size reduction of relatively coarse feeds in conventional crushers and high pressure grinding rolls, Minerals Engineering, 23(2), 151-153 (2010).
S. Morrell and R. D. Morrison, Ore charge, ball load and material flow effects on an energy based SAG mill model, SAG 1989: Advances in Autogenous and Semiautogenous Grinding Technology, ed. A. L. Mular and G. E. Agar, University British Columbia, Vancouver, vol. 2, 1989, 697-711.
R. D. Morrison, P. W. Cleary and M. D. Sinnott, Using DEM to compare the energy efficiency of pilot scale ball and tower mills, Minerals Engineering, 22(7/8), 665-672 (2009).
R. D. Morrison and S. Morrell, Comparison of comminution circuit energy efficiency using simulation, Minerals Metallurgical Processing, 15(4), 22-25 (1998).
G. Mucsi and B. Csoke, Development of grindability tests based on direct measurement of energy, XXV International Mineral Processing Congress—IMPC 2010, Australasian Institute Mining Metallurgy, Melbourne, 2010, 1047-1055.
F. Musa, M. Stewart and G. Weiss, Energy efficiency opportunities in milling—Improving comminution circuit efficiency. Metallurgical Plant Design and Operating Strategies (MetPlant2011), Australasian Institute Mining Metallurgy, Melbourne, 2011, 154-162.
T. Mutze, Energy dissipation in particle bed comminution, International J. Mineral Processing, 136, 15-19 (2015).
A. H. Mwale, P. Musonge and D. M. Fraser, The influence of particle size on energy consumption and water recovery in comminution and dewatering systems, Minerals Engineering, 18(9), 915-926 (2005).
S. Nadolski, B. Klein, A. Kumar and Z. Davaanyam, An energy benchmarking model for mineral comminution, Minerals Engineering, 65, 178-186 (2014).
T. Napier-Munn, Is progress in energy-efficient comminution doomed?, Minerals Engineering, 73, 1-6 (2015).
Napier-Munn-CEEC-3-12 Comminution Energy and How to Reduce it Novel Flow sheets.

(56) References Cited

OTHER PUBLICATIONS

T. E. Norgate and K. R. Weller, Selection and operation of high pressure grinding rolls circuits for minimum energy consumption. Minerals Engineering, 7(10), 1253-1267 (1994.
D. A. Dahlstrom and W. P. Kam, Comminution energy reduction by two-stage classification, Advances in Fine Particle Processing, ed. J. Hanna and Y. A. Attia, Elsevier, New York, 1990, 3-17.
International Search Report dated Feb. 21, 2019 from corresponding International Patent Application No. PCT/CA2018/051541, 4 pages.
Written Opinion dated Feb. 21, 2019 from corresponding International Patent Application No. PCT/CA2018/051541, 5 pages.
D. Norrgran, Magnetic liners increase productivity, reduce energy consumption in iron ore grinding mills, Mining Engineering, 61(12), 28-30 (2009).
S. Palaniandy, M. Powell, M. Hilden, J. Allen, K. Kermanshahi, B. Oats and M. Lollback, VertiMill®—Preparing the feed within floatable regime at lower specific energy. Minerals Engineering, 73, 44-52 (2015).
B. K. Parekh, H. E. Epstein and W. M. Goldberger, Novel comminution process uses electric and ultrasonic energy, Mining Engineering, 36(9), 1305-1309 (1980).
N. Patzelt, Energy efficient grinding of ores and minerals with high-pressure grinding rolls, Annual Canadian Mineral Processors Meeting, Ottawa, 1991.
A. E. C. Peres and P. E. C. Pereira, Energy calculations for SAG grinding of a sulphide copper ore, Copper 2007—vol. II—Mineral Processing, ed. R. Del Villar, J. E. Nesset, C. O. Gomez and A. W. Stradling, Canadian Institute Mining Metallurgy, Montreal, 2007, 257-263.
Z. Pokrajcic, "Energy efficient comminution circuits: A modified grinding strategy and the selection of a target product size." Centre for Sustainable Resource Processing 2nd Annual Conference (CSRP'08). Centre for Sustainable Resource Processing, 2008.
P. Pourghahramani and E. Forssberg, Comparative study of microstructural characteristics and stored energy of mechanically activated hematite in different grinding environments, International J. Mineral Processing, 79(2), 120-139 (2006).
M. S. Powell and A. R. Bye, Beyond mine-to-mill—Circuit design for energy efficient resource utilisation, Tenth Mill Operators' Conference, Australasian Institute Mining Metallurgy, Melbourne, 2009, 357-364.
M. S. Powell, H. Benzer, and A. N. Mainza. "Integrating the strengths of SAG and HPGR in a flexible circuit designs." Proceedings International autogenous and semiautogenous grinding technology (2011): 25-28.
M. S. Powell, and A. N. Mainza. "Step change—a staircase rather than a giant leap." XXVI IMPC, Delhi, Paper 1127 (2012).
P. Radziszewski, Energy recovery potential in comminution processes, Minerals Engineering, 46-47, 83-88 (2013).
P. Radziszewski and J. Allen, Towards a better understanding of stirred milling technologies—Estimating power consumption and energy use, Proceedings 46th Annual Meeting of the Canadian Mineral Processors, ed. T. Crowie and J. Zinck, Canadian Institute Mining Metallurgy, Montreal, 2014, 55-66.
R. Rajamani, S. Latchireddi, S. Prathy and T. Patra, Improving energy efficiency via optimised charge motion and slurry flow in plant scale SAG mills, Annual SME-AIME Meeting, Salt Lake City, 2005.
R. Rajamani, S. Latchireddi, J. Stieger and D. Plummer, Energy savings in the Cortez Gold Mines SAG milling operation after redesigning shell and pulp lifters, Annual SME-AIME Meeting, Denver, 2007.
R. K. Rajamani, S. Agrawala and B.K. Mishra, Mill scale-up: Ball collision frequency and collision energy density in laboratory and plant-scale mills, XVIII International Mineral Processing Congress. vol. 1. Comminution and Classification, Australasian Institute Mining Metallurgy, Melbourne, 1993, 103-107.
K. Rieger, M. Clement and H. Uetz, Fineness, wear of the grinding apparatus, and energy consumption by circulatory grinding of mineral raw materials, Wear, 76(1), 49-67 (1982).

P. Rosario and R. Hall, A structured approach to the evaluation of the energy requirement of HPGR and SAG mill circuits in hand ore applications, J. South African Institute Mining Metallurgy, 110(3), 117-123 (2010).
C. M. Rule, Energy considerations in the current PGM processing flowsheet utilising new technology, Third International Platinum Conference—Platinum in Transformation, Southern African Institute Mining Metallurgy, Johannesburg, 2008, 45-x.
S. Sadrai, J. A. Meech, D. Tromans and F. Sassani, Energy efficient comminution under high velocity impact fragmentation, Minerals Engineering, 24(10), 1053-1061 (2011).
C. Schuffeneger, Tendencies and considerations for energy efficiency in SAG mill circuit design from recent projects in Chile, Proceedings Annual Meeting Canadian Mineral Processors, Canadian Institute Mining Metallurgy, Montreal, 2012, 419-430.
F. Shi and W. Xie, A specific energy-based size reduction model for batch grinding ball mill, Minerals Engineering, 70, 130-140(2015).
M. Silva and A. Casali, Modelling SAG milling power and specific energy consumption including the feed percentage of ntermediate size particles, Minerals Engineering, 70, 156-161 (1015).
M. Sinnott, P.W. Cleary and R. Morrison, Analysis of stirred mill performance using DEM simulation: Part 1—Media motion, energy consumption and collisional environment, Minerals Engineering, 19(15), 1537-1550 (2006).
E. Th. Stamboliadis, A contribution to the relationship of energy and particle size in the comminution of brittle particulate materials, Minerals Engineering, 15(10), 707-713 (2002).
E. Th. Stamboliadis, The energy distribution theory of comminution specific surface energy, mill efficiency and distribution mode, Minerals Engineering, 20(2), 140-145 (2007).
H. H. Stender, A. Kwade and J. Schwedes, Stress energy distribution in different stirred media mill geometries, International J. Mineral Processing, 78S, S103-S117 (2004).
L.M. Tavares, Energy absorbed in breakage of single particles in drop weight testing, Minerals Engineering, 12(1), 43-50 (1999).
A. Thomas and L.O. Filippov, Fractures, fractals and breakage energy of mineral particles, International J. Mineral Processing, 57(4), 285-301 (1999).
K. Tkacova, H. Heegn and N. Stevulova, Energy transfer and conversion during comminution and mechanical activation, International J. Mineral Processing, 40(1/2), 17-31 (1993).
R. Tomanec and J. Milovanovic, Mineral liberation and energy saving strategies in mineral processing, Fizykochemiczne Problemy Mineralurgii, 28, 195-205 (1994).
D. Tromans, Mineral comminution: Energy efficiency considerations, Minerals Engineering, 21(8), 613-620 (2008).
E. Tugan Tuzcu and R.K. Rajamani, Modelling breakage rates in mills with impact energy spectra and ultra-fast load cell data, Minerals Engineering, 24(3/4), 252-260 (2011).
W. Valery and E. Rybinski, Optimisation process at Antamina boosts production and energy efficiency, Engineering Mining J., 213(9), 116-120 (2012).
W. Valery, R. Valle, R. Hayashida, K.A. Duffy, E. Tabosa, & P. Holtham, Achieving Excellence in Sustainable Operating Efficiency.
W. Valery, R. Vale, K. A. Duffy, A. Jankovic, and E. Tabosa, Complete Optimisation from Mine-to-Mill to Maximise Profitability.
F. P. Van Der Meer, The effect of roller press grinding on ball milling energy, Erzmetall, 50(9), 554-561 (1997).
W. Van Drunick, C. Gerold and N. Palm, Implementation of an energy efficient dry grinding technology into an Anglo American zinc beneficiation process, XXV International Mineral Processing Congress—IMPC 2010, Australasian Institute Mining Metallurgy, Melbourne, 2010, 1333-1341.
K. B. Venkatesh, M. Hussain and V.K. Gupta, An evaluation of various energy-size relationships for prediction of specific energy requirement for ball milling operation, XXVI International Mineral Processing Congress, Indian Institute Metals, New Delhi, 2012, 5650-5659.
V. R. Voller, A note on energy-size reduction relationships in comminution, Powder Technology, 36(2), 218-236 (1983).
H. Von Michaelis, How energy efficient is HPGR?, World Gold Conference 2009, Southern African Institute Mining Metallurgy, Johannesburg, 2009, 7-x.

(56) References Cited

OTHER PUBLICATIONS

C. Wang, S. Nadolski, O. Mejia, J. Drozdiak and B. Klein, Energy and cost comparison of HPGR based circuits with the SABC circuit installed at the Huckleberry mine, Proceedings Annual Canadian Mineral Processors Operators Conference, Canadian Institute Mining Metallurgy, Montreal, 2013, 121-135.

E. Wang, F. Shi and E. Maniapig, Mineral liberation by high voltage pulse and conventional comminution with same specific energy levels, Minerals Engineering, 27-28, 28-36 (2012).

M. H. Wang, R.Y. Yang and A.B. Yu, DEM investigation of energy distribution and particle breakage in tumbling ball mills, Powder Technology, 223, 83-91 (2012).

J. A. Wells, Vibro energy milling—Its application to gold recovery, Annual Canadian Mineral Processors Conference, Ottawa, 1988.

E. Yigit, Three mathematical comminution models based on strain energy, International J. Mineral Processing, 3(4), 365-374 (1976).

Y. Zeng and E. Forssberg, Effects of mill feed size on product fineness and energy consumption in coarse grinding, Minerals Engineering, 4(5/6), 599-609 (1991).

Y. Zeng and E. Forssberg, Energy consumption in fine crushing and dry rod grinding, Minerals Metallurgical Processing, 9(2), 69-72 (1992).

J. Zheng, C.C. Harris and P. Somasundaran, A study on grinding and energy input in stirred media mills, Powder Technology, 86(2), 171-178 (1996).

W. Zuo and F. Shi, A t10-based method for evaluation of ore pre-weakening and energy reduction, Minerals Engineering, 79, 212-219 (2015).

Doubling Australia's energy productivity by 2030, Re-energising the mining sector to improve its competitiveness, https://www.2xep.org.au/files/sectors/2xEP_Mining_Sector_Overview_150610.pdf.

Canadian Office Action dated Dec. 15, 2021 for Canadian Appl. No. 3,079,989.

ARIPO Office Action dated Sep. 16, 2021 for ARIPO Appl. No. AP/P/2020/012435.

Megraw, H.A.; "All Slime Treatment of Ore in Cyanide Plants"; The Engineering and Mining Journal; Feb. 10, 1910; 3pgs.

D. Baeza and A. Villanueva, A simplified method for determination of energy consumption in semi autogenous grinding, Third International Mineral Processing Workshop: PROCEMIN 2004, Santiago, 2004. (English Abstract).

J. A. Barrat, P. G. Davey, G. R. Gatchalian and W. L. Puckering, The influence of energy conservation on concentrator design, Canadian Institute Mining Metallurgy Bulletin, 68 (764), 85-93 (1975).

S. Bradshaw, T.V.C.T. Chan, N. Rowson, R. Greenwood, S. Kingman and K. Jackson, Microwave assisted comminution of ores at economically viable energy inputs, Microwave and Radio Frequency Applications, ed, D. C. Folz, American Ceramic Society, Westerville, 2003, 247-256.

H. E. Cohen, Energy usage in mineral processing, Transactions Institution Mining Metallurgy, 92, C160-C164 (1983).

D. A. Dahlstrom, Impact of changing energy economics on mineral processing, Mining Engineering, 38(1), 45-48 (1986).

C. C. Dan and H. Schubert, Breakage probability, progeny size distribution and energy utilisation of comminution by impact, Aufbereitungs Technik, 31(5), 241-247 (1990).

M. Esvelt, Z. Pokrojcic and L. Bartsch, Comminution energy efficiency and project economics in magnetite circuit design, Bulletin Australasian Institute Mining Metallurgy, 2012(5), 38-44.

D. Freiermuth and K. Kirchner, Ball energy distribution in ball mills as a function of grinding parameters, German Chemical Engineering, 6(2), 98-104 (1983).

D. W. Fuerstenau and A. M. Abouzeid, Energy efficiency in comminution, Annual SME-AIME Meeting, Phoenix, 2002.

D. W. Fuerstenau and P. C. Kapur, A new approach to assessing the grindability of solids and the energy efficiency of grinding mills, Minerals Metallurgical Processing, 11(4), 210-216 (1994).

D. W. Fuerstenau and M. R. Moharam, Specific energy considerations in dry batch rod mill comminution, Powder Technology, ed. K. Iinoya, J. K. Beddow and G. Jimbo, Hemisphere Publishing, Washington, 1984, 388-395.

M. Gao, G. Lane, P. Schwarz and R. Holmes, Energy efficient technologies for fine and ultrafine grinding, Bulletin Australasian Institute Mining Metallurgy, 2003(4), 36-40.

D. Goeldner, Energy reduction objective creates new role for dry grind rollers, Bulletin Australasian Institute Mining Metallurgy, 2003(4), 30-34.

H. Hoberg, T. Loesche and F. U. Schneider, Studies of the floatability of sulphides after dry grinding: A contribution to the development of an alternative energy-saving method for the preparation of sulphide ores, Aufbereitungs Technik, 26(4), 171-182 (1985).

T. Inoue and K. Okaya, Micro-scale physical model to account for energy spectrum distribution in the ball mill for sophisticated performance prediction, Proceedings of the XXI International Mineral Processing Congress, ed. P. Massacci, Elsevier, Amsterdam, vol. A, 2000, A3-16/23.

N. W. Johnson, "Review of Existing Eco-efficient Comminution Devices." The Coalition for Eco-Efficient Comminution (CEEC) Review paper (2006).

M. C. Kerr and J. S. Reed, Comparative grinding kinetics and grinding energy, Bulletin American Ceramic Society, 71(12), 1809-1816 (1992).

P. G. Kihlstedt, Energy and minerals beneficiation, Materials Aspects of World Energy Needs, National Academy Sciences, Washington, 1980, 216-218.

J. Leluschko and K. Kirchner, Wet grinding in ball mills—Part 2: Crushing results and utilisable ball energy, Aufbereitungs Technik, 29(12), 675-682 (1988).

F. A. Lopez, J. L. Nieto and J. Ortiz, Determination of energy parameters in grinding of lateritic ores, Revista Metallurgia (Madrid), 24(4), 255-260 (1988).

A. J. Magerowski, Energy utilization in a comminution circuit, Mineral Processing and Extractive Metallurgy, ed. M. J. Jones and P. Gill, Institution Mining Metallurgy, London, 1984, 113-116.

C. Ntsele and J. Allen, Technology selection of stirred mills for energy efficiency in primary and regrinding applications tor the platinum industry, Platinum 2012, Southern African Institute Mining Metallurgy, Johannesburg, 2012, 781-808.

O. A. Orumwense and E. Forssberg, Studies on low amplitude vibro-energy grinding mill, Aufbereitungs Technik, 31(2), 63-72 (1990.

Z. Pokrajcic, and R. D. Morrison. "A simulation methodology for the design of eco efficient comminution circuits." XXIV International Mineral Processing Congress (XXIV IMPC). vol. 1. Science Press, 2008.

Zeljka Pokrajcic, "A methodology for the design of energy efficient comminution circuits." UQ Thesis (2010).

S. Raghavan, Study of parameters which influence the energy utilization efficiency in the grinding of gabbro ores, US Bureau Mines Report OFR 122082 (1981).

R. Rajamani, E. Tuzcu and B. Mishra, Modelling ball mills and semi-autogenous mills with impact energy spectra based population balance concept, Annual SME-AIME Meeting, Denver, 2011.

K. Rieger, M. Clement and H. Uetz, Grinding fineness, wear of liners, and energy consumption of grinding circuits of mineral raw materials—Studies in a model grinding plant, Erzmetall, 35(2), 81-90 (1982).

M. Sokolowski, A new idea of a general law of comminution and establishing energy indices, Aufbereitungs Technik, 36(3), 107-110 (1995).

P. Tiggesbaumker and M. Muller, Influence of ball mill speed on energy expenditure and throughput capacity, Pit Quarry, 77(1), 56-63 (1984).

W. Van Drunick and I. Smit, Energy efficient comminution—HPGR experience at Anglo Research, International Autogenous and Semiautogenous Grinding Technology 2006, ed. M.J. Allan, K. Major, B.C. Flintoff, B. Klein and A.L. Mular, University British Columbia, Vancouver, vol. IV, 2006, 124-139.

W. I. Van Drunick and M.H. Moys, The use of energy balance to measure and control the rheology of mill discharge slurry, Proceed-

(56) References Cited

OTHER PUBLICATIONS ings International Autogenous and Semiautogenous Grinding Technology 2001, ed. D.J. Barratt, M.J. Allan and A.L. Mular, University British Columbia, Vancouver, vol. II, 2001, 304-316.

H. Ye, B. Xu and Z. Zhou, A new equation of comminution work-energy yield equation, J. Central South Institute Mining Metallurgy, 1985(2), 121-126. (English Abstract).

C. Wang, S. Nadolski, O. Mejia, J. Drozdiak, & B. Klein (2013). Energy and Cost Comparisons of HPGR-Based Circuits. Engineering and Mining Journal, 214(12), 102.

Y. Zeng and E. Forssberg, Effect of powder filling fraction on particle size and energy consumption in coarse grinding, Scandinavian J. Metallurgy, 20(5), 300-304 (1991).

Y. Zeng and E. Forssberg, Effects of setting of product size and energy consumption in a laboratory scale jaw crusher, Aufbereitungs Technik, 32(10), 527-538 (1991).

Y. Zeng and E. Forssberg, Energy benefits by reducing mill feed size using fine crushing, Scandinavian J. Metallurgy, 21(4), 151-158 (1992.

A. C. Apling, Energy consumption for grinding in ore beneficiation, Epitoanyag, 39(6), 183-188 (1987).

M. Grujic, D. Ocepek and D. Salatic, Capacity and expenditure of energy and steel after grinding reconstruction in Majdanpek Copper Mine, Rudarsko Metalurski Zbornik, 36(3), 587-597 (1989).

D. K. Kryukov, V.I. Kirchenko, A.S. Beshta and A.V. Bortnikov, Mechanics of disintegration in an energy-saving mill MPS(R), Obogashchenie Rud (Leningrad), 1990(1), 25-30.

J. Malewski, Relation between grain composition and grinding energy is determined with the aid of laboratory tests, Rudy Metale Niezelazne, 34(10), 350-354 (1989).

J. Placzek, A. Chycki, J. Borkowski and S. Kasprzyk, Possibilities of reducing energy consumption of ore dressing processes for enrichment, Rudy Metale Niezelazne, 32(10), 387-388 (1987).

D. Yu. Antrushin, N. A. Zenkevich and O. I. Lebedeva, Algorithm for optimization of multistage crushing according to the energy consumption criterion, Obogashchenie Rud, 1994(3), 16-21. [77453].

K. S. E. Forssberg, Comparison of electrical and mechanical energy measurement systems in laboratory grinding investigations, Annual AIME Meeting, New York, 1975.

Y. C Lo, Grinding media effect on energy efficiency via microscale comminution studies, Annual SME-AIME Meeting, Orlando, 1998.

N. Magdalinovic, Decreasing of electric energy consumption in the flotation plants. Technological possibilities of reduction of energy consumption in grinding and mineral classification, Copper (Bor), 42, 17-21 (1986).

L. Pastucha, E. Mielczarek and H. Otwinowski, Energy consumption during pneumatic jet milling, Arch. Min. Sci, 33(1), 1-9 (1988).

K. Schoenert, Saving energy with high-pressure grinding, Industrie Mineral Mines Carrieres Techniques, 1990(6/7), 11-15.

\* cited by examiner

LOW ENERGY PROCESS FOR METAL EXTRACTION

CROSS-REFERENCED APPLICATIONS

This application claim priority to U.S. Provisional Application No. 62/594,393, filed on Dec. 4, 2017 and is a national phase application of PCT Application No. PCT/CA2018/051541, filed on Dec. 3, 2018, both of which are incorporated by reference thereto in their entireties.

BACKGROUND

1. Field of the Disclosure

The present disclosure relates to the field of processing of mineralized ores. Specifically, the present disclosure pertains to methods of separation of metals from mineralized ore.

2. Discussion of the Background Art

Traditionally, metal milling processes involve crushing and grinding of ore. Such methods of separation of metals, in particular precious metals, from ore require a large amount of energy expenditure.

Comminution consumes 1-4% of all electrical power generated in the world and about 50% of minesite energy consumption is due to comminution (http://www.ceecthefuture.org/wp-content/uploads/2012/11/Napier-Munn-CEEC-3-12.pdf). Comminution has long been touted as an energy intensive and inefficient process. Grinding mills often featured in most comminution circuits, are inefficient and have a random nature of particle size reduction. There remains a limited understanding, however, of how operating comminution circuits compare in terms of energy usage and cost.

A need, therefore, exists for the development of a more energy efficient process for metal extraction in mineralized ore processing.

SUMMARY

In accordance with a first aspect, there is provided a method for preparing ore for precious metal extraction comprising steps of:
  a. crushing ore;
  b. grinding the crushed ore;
  c. screening the ground ore to separate ore particles into a first group of large ore particles and a first group of small ore particles;
  d. crushing the first group of large ore particles;
  e. screening the crushed ore to separate into a second group of large ore particles and a second group of small ore particles;
  f. separating the second group of small ore particles from the screen into a third group of large particles and a third group of small particles;
  g. milling the third group of large ore particles;
  h. separating milled particles into a fourth group of large particles and a fourth group of small particles; and
  i. sending the third and fourth group of small particles for further metal extraction processing.

In other aspects of the method described herein, wherein the first group of large particles has a size range of about 100 mm to about 50 mm and the first group of small particles has a size range of less than about 10 mm. In another aspect, wherein the second group of large particles has a size range of about 50 mm to about 30 mm and the second group of small particles has a size range of less than about 10 mm. In another aspect, wherein the third group of large particles has a size range of about 30 mm to about 20 mm and the third group of small particles has a size range of less than about 10 mm. In another aspect, wherein the fourth group of large particles has a size range of about 20 mm to about 10 mm and the fourth group of small particles has a size range of less than about 10 mm.

In accordance with a second aspect, there is provided a method for preparing ore for precious metal extraction comprising steps of:
  a. crushing ore;
  b. screening crushed ore to separate into a first group of large ore particles and a first group of fines particles;
  c. crushing the first group of large ore particles;
  d. screening the re-crushed first group of ore particles to separate into a second group of large ore particles and a second group of fines particles;
  e. rolls crushing the second group of large ore particles;
  f. screening the rolls crushed particles, the first group of fines particles and the second group of fines particles;
  g. separating the screened particles into a third group of large particles and a first group of small particles;
  h. ball milling the third group of large particles;
  i. separating the ball milled particles into a fourth group of large particles and a second group of small particles; and
  j. sending the first and second groups of small particles for further metal extraction processing.

In accordance with a third aspect, there is provided a method for preparing ore for precious metal extraction comprising steps of:
  a. crushing ore;
  b. screening crushed ore to separate into a first group of large ore particles and a first group of fines particles;
  c. crushing the first group of large ore particles;
  d. screening the re-crushed first group of ore particles to separate into a second group of large ore particles and a second group of fines particles;
  e. rolls crushing the second group of large ore particles;
  f. screening the rolls crushed particles, the first group of fines particles, and the second group of fines particles;
  g. ball milling the screened particles;
  h. separating the ball milled particles into a third group of large particles and a first group of small particles;
  i. ball milling the third group of large particles and further separating the ball milled third group of large particles;
  j. separating the first group of small particles into a fourth group of large particles and a second group of small particles;
  k. stir milling the fourth group of large particles and further separating the stir milled fourth group of large particles; and
  l. sending the second group of small particles for further metal extraction processing.

In accordance with a fourth aspect, there is provided a method for preparing ore for precious metal extraction comprising steps of:
  a. crushing ore;
  b. screening crushed ore to separate into a first group of large ore particles and a first group of fines particles;
  c. crushing the first group of large ore particles;
  d. screening the re-crushed first group of ore particles to separate into a second group of large ore particles and a second group of fines particles;
  e. rolls crushing the second group of large ore particles;

f. screening the rolls crushed particles, the first group of fines particles, and the second group of fines particles;
g. separating the screened particles into a third group of large particles and a first group of small particles;
h. ball milling the third group of large particles;
i. separating the first group of small particles and the ball milled third group of large particles from the ball mill into a fourth group of large particles and a second group of small particles;
j. stir milling the fourth group of large particles and further separating the stir milled fourth group of large particles; and
k. sending the second group of small particles for further metal extraction processing.

In accordance with a fifth aspect, there is provided a method for preparing ore for precious metal extraction comprising steps of:
a. crushing ore;
b. screening crushed ore to separate into a first group of large ore particles and a first group of fines particles;
c. sorting the first group of large ore particles via sensor-based sorting to eliminate waste particles;
d. crushing the sorted ore particles;
e. screening the re-crushed sorted ore particles to separate into a second group of large ore particles and a second group of fines particles;
f. sorting the second group of large ore particles via sensor-based sorting to eliminate further waste particles;
g. rolls crushing the sorted second group of large ore particles;
h. screening the rolls crushed particles, the first group of fines particles, and the second group of fines particles;
i. separating the screened particles into a third group of large particles and a first group of small particles;
j. ball milling the third group of large particles;
k. separating the first group of small particles and the ball milled third group of large particles into a fourth group of large particles and a second group of small particles;
l. stir milling the fourth group of large particles and further separating the stir milled fourth group of large particles; and
m. sending the second group of small particles for further metal extraction processing.

In other aspects of the methods described herein, wherein the first group of large particles has a size range of about 100 mm to about 50 mm and the first group of fines particles has a size range of about 15 mm to about 6 mm.

In accordance with a sixth aspect, there is provided a method for preparing ore for precious metal extraction comprising steps of:
a. crushing ore;
b. screening crushed ore to separate into a first group of large ore particles a group of middle ore particles and a first group of fines particles;
c. sorting the first group of large ore particles via bulk sorting to eliminate waste particles;
d. sorting the group of middle ore particles via sensor-based sorting to eliminate waste particles
e. crushing the bulk-sorted ore particles;
f. screening the re-crushed bulk-sorted ore particles to separate into a second group of large ore particles and a second group of fines particles;
g. sorting the second group of large ore particles via sensor-based sorting;
h. rolls crushing the sorted group of middle ore particles and the sorted second group of large ore particles;
i. screening the rolls crushed particles, the first group of fines particles, and the second group of fines particles;
j. separating the screened particles into a third group of large particles and a first group of small particles;
k. ball milling the third group of large particles;
l. separating the first group of small particles and the ball milled third group of large particles from the ball mill into a fourth group of large particles and a second group of small particles;
m. stir milling the fourth group of large particles and further separating the stir milled fourth group of large particles; and
n. sending the second group of small particles for further metal extraction processing.

In a seventh aspect, there is provided a method for preparing ore for precious metal extraction comprising steps of:
a. crushing ore;
b. screening crushed ore to separate into a first group of large ore particles, a group of middle ore particles and a first group of fines particles;
c. sorting the first group of large ore particles via bulk sorting to eliminate waste particles;
d. sorting the group of middle ore particles via sensor-based sorting to eliminate further waste particles
e. crushing the bulk-sorted ore particles;
f. screening the re-crushed bulk-sorted ore particles to separate into a second group of large ore particles and a second group of fines particles;
g. sorting the second group of large ore particles via sensor-based sorting;
h. rolls crushing the sorted group of middle ore products and the second group of large ore particles;
i. screening the rolls crushed particles, the first group of fines particles, and the second group of fines particles;
j. separating the screened particles into a third group of large particles and a first group of small particles;
k. ball milling the third group of large particles;
l. utilizing coarse flotation on the ball milled particles to recover concentrate and eliminate flotation waste particles;
m. separating the first group of small particles and the recovered concentrate into a fourth group of large particles and a second group of small particles;
n. stir milling the fourth group of large particles and further separating the stir milled fourth group of large particles; and
o. sending the second group of small particles for further metal extraction processing.

In other aspects of the methods described herein, wherein the primary crusher is selected from the group of a gyratory crusher, a tooth roll sizer, and a jaw crusher. In another aspect, wherein the secondary crusher is a pebble crusher. In another aspect, wherein the secondary crusher is selected from the group of a cone crusher, a rolls crusher, an impact crusher, a hammer mill, and a toothed sizer. In another aspect, the method further comprises eliminating waste particles at each step of the method. In another aspect, wherein the primary crusher crushes ore to a size range of about 1000 mm to about 200 mm. In another aspect, wherein the first group of large particles has a size range of about 300 mm to about 80 mm, a group of middle particles has a size range of about 80 mm to about 20 mm and the first group of fines particles has a size range of about 15 mm to about 6 mm. In another aspect, wherein the second group of large particles has a size range of about 50 mm to about 30 mm and the second group of fines particles has a size range of about 15 mm to about 6 mm. In another aspect, wherein the third group of large particles has a size range of about 30 mm to about 20 mm and the first group of small particles has a size range about 15 mm to about 6 mm. In another aspect, wherein the fourth group of large particles has a size range of about 20 mm to about 10 mm and the second group of small particles has a size range of less than about 10 mm. In another aspect, wherein the sensor-based sorting is done by sensors selected from the group comprising X-ray transmission (XRT) sensors, X-ray fluorescence (XRF) sensors, and 3D laser sensors.

With respect to the method of the first aspect, wherein steps a) to i) produce a specific energy consumption in a range of about 18 kWh/t to about 22 kWh/t, and an installed energy in a range of about 43 MW to about 48 MW. With respect to the method of the second aspect, wherein steps a) to j) produce a specific energy consumption in a range of about 16.5 kWh/t to about 19 kWh/t, an installed energy in a range of about 38 MW to about 43 MW, and a specific energy reduction of about −12% to about −18% when compared to the method of the first aspect. With respect to the method of the third aspect, wherein steps a) to l) produce a specific energy consumption in a range of about 13.1 kWh/t to about 14.5 kWh/t, an installed energy in a range of about 32 MW to about 36 MW, and a specific energy reduction of about −28% to about −33% when compared to the method of the first aspect. With respect to the method of the fourth aspect, wherein steps a) to k) produce a specific energy consumption in a range of about 12.5 kWh/t to about 14 kWh/t, an installed energy in a range of about 31 MW to about 35 MW, and a specific energy reduction of −30% to about 37% when compared to the method of the first aspect. With respect to the method of the fifth aspect, wherein steps a) to m) produce a specific energy consumption in a range of about 9 kWh/t to about 14 kWh/t, an installed energy in a range of about 25 MW to about 30 MW, and a specific energy reduction of about −40% to about 47% when compared to the method of the first aspect. With respect to the method of the sixth aspect, wherein steps a) to n) produce a specific energy consumption in a range of about 8 kWh/t to about 12 kWh/t, an installed energy in a range of about 23 MW to about 28 MW, and a specific energy reduction of about −50% to about 55% when compared to the method of the first aspect. With respect to the method of the seventh aspect, wherein steps a) to o) produce a specific energy consumption in a range of about 7 kWh/t to about 10 kWh/t, an installed energy in a range of about 20 MW to about 25 MW, and a specific energy reduction of about −55% to about −60% when compared to the method of the first aspect.

In an eighth aspect, there is provided a system for preparing ore for precious metal extraction comprising: a primary crusher for crushing ore; a SAG mill for grinding the crushed ore; a screen for screening ground ore into a first group of large particles and a first group of small particles; a secondary crusher for crushing large particles from the screen, the crushed ore from the secondary crusher passed on to the screen for separating into a second group of large particles and a second group of small particles; a cyclone for separating the second group of small particles from the screen into a third group of large particles and a third group of small particles; and a ball mill for milling the third group of particles from the cyclone, the milled particles fed into the cyclone for separating into a fourth group of large particles and a fourth group of small particles, wherein the third and the fourth group of small particles from the cyclone are sent for further metal extraction processing.

In other aspects of the system described herein, wherein the secondary crusher is a pebble crusher. In another aspect, wherein the first group of large particles has a size range of about 100 mm to about 50 mm and the first group of small particles has a size range of less than about 10 mm. In another aspect, wherein the second group of large particles has a size range of about 50 mm to about 30 mm and the second group of small particles has a size range of less than about 10 mm. In another aspect, wherein the second group of large particles has a size range of about 50 mm to about 30 mm and the second group of fines particles has a size range of about 15 mm to about 6 mm. In another aspect, wherein the third group of large particles has a size range of about 30 mm to about 20 mm and the third group of small particles has a size range of less than about 10 mm. In another aspect, wherein the fourth group of large particles has a size range of about 20 mm to about 10 mm and the fourth group of small particles has a size range of less than about 10 mm.

In a ninth aspect, there is provided a system for preparing ore for precious metal extraction comprising: a primary crusher for crushing ore; a first screen for screening the crushed ore into a first group of large ore particles and a first group of fines particles; a secondary crusher for crushing the first group of large ore particles from the first screen; a second screen for screening the crushed first group of large ore particles into a second group of large ore particles and a second group of fines particles; a rolls crusher for crushing the second group of large ore particles; a third screen for screening the rolls crushed second group of large ore particles, the first group of fines particles and the second group of fines particles; a cyclone for separating the screened particles from the third screen into a third group of large particles and small particles; a ball mill for milling the third group of large particles from the cyclone, wherein the milled third group of large particles are sent back to the cyclone for further separating and wherein the small particles from the cyclone are sent on for further metal extraction processing.

In a tenth aspect, there is provided a system for preparing ore for precious metal extraction comprising: a primary crusher for crushing ore; a first screen for screening the crushed ore into a first group of large ore particles and a first group of fines particles; a secondary crusher for crushing the first group of large ore particles from the first screen; a second screen for screening the crushed first group of large ore particles into a second group of large ore particles and a second group of fines particles; a rolls crusher for crushing the group of middle ore particles and the second group of large ore particles; a third screen for screening the rolls crushed particles, the first group of fines particles and the second group of fines particles; a ball mill for milling the screened particles from the third screen; a first cyclone for separating the screened particles from the third screen into a third group of large particles and a first group of small particles, the third group of large particles returned to the ball mill for milling and then returned to the first cyclone for further separating; a second cyclone for separating the first group of small particles from the first cyclone into a fourth group of large particles and a second group of small particles; and a stirred mill for milling the fourth group of large particles from the second cyclone and returning the milled fourth group of large particles to the second cyclone for further separating, wherein the second group of small particles from the second cyclone are sent on for further metal extraction processing.

In an eleventh aspect, there is provided a system for preparing ore for precious metal extraction comprising: a primary crusher for crushing ore; a first screen for screening the crushed ore into a first group of large ore particles and a first group of fines particles; a secondary crusher for crushing the first group of large ore particles from the first screen; a second screen for screening the crushed first group of large ore particles into a second group of large ore particles and a second group of fines particles; a rolls crusher for crushing the second group of large ore particles; a third screen for screening the rolls crushed second group of large ore particles, the first group of fines particles and the second group of fines particles; a first cyclone for separating the screened particles from the third screen into a third group of large and a first group of small particles; an open-circuit ball mills for milling the third group of large particles from the first cyclone; a second cyclone for separating the first group of small particles and the ball milled third group of large particles into a fourth group of large particles and a second group of small particles; and a stirred mill for milling the fourth group of large particles from the second cyclone and returned to the second cyclone for further separating, wherein the second group of small particles from the second cyclone are sent on for further metal extraction processing.

In other aspects of the systems described herein, wherein the first group of large particles has a size range of about 100 mm to about 50 mm and the first group of fines particles has a size range of about 15 mm to about 6 mm.

In a twelfth aspect, there is provided a system for preparing ore for precious metal extraction comprising: a primary crusher for crushing ore; a first screen for screening the crushed ore into a first group of large ore particles and a first group of fines particles; an ore sorter for sorting the first group of large ore particles to eliminate waste particles; a secondary crusher for crushing the first group of large ore particles from the first screen; a second screen for screening the crushed first group of large ore particles into a second group of large ore particles and a second group of fines particles, the large ore particles sent back to the ore sorter for further sorting; a rolls crusher for crushing the second group of large ore particles from the ore sorter; a third screen for screening the rolls crushed second group of large ore particles, the first group of fines particles and the second group of fines particles; a first cyclone for separating the screened particles from the third screen into a third group of large and a first group of small particles; an open-circuit ball mills for milling the third group of large particles from the first cyclone; a second cyclone for separating the first group of small particles and the ball milled third group of large particles into a fourth group of large particles and a second group of small particles; and a stirred mill for milling the fourth group of large particles from the second cyclone and returned to the second cyclone for further separating, wherein the second group of small particles from the second cyclone are sent on for further metal extraction processing.

In a thirteenth aspect, there is provided a system for preparing ore for precious metal extraction comprising: a primary crusher for crushing ore; a first screen for screening the crushed ore into a first group of large ore particles, a group of middle ore particles, and a first group of fines particles; a bulk sorter for sorting the first group of large ore particles to eliminate waste particles; an ore sorter for sorting the group of middle ore particles to eliminate waste particles; a secondary crusher for crushing the first group of large ore particles from the first screen; a second screen for screening the crushed first group of large ore particles into a second group of large ore particles and a second group of fines particles, the large ore particles sent back to the ore sorter for further sorting; a rolls crusher for crushing the group of middle ore particles and the second group of large ore particles from the ore sorter; a third screen for screening the rolls crushed particles, the first group of fines particles and the second group of fines particles; a first cyclone for separating the screened particles from the third screen into a third group of large and a first group of small particles; a ball mill for milling the third group of large particles from the first cyclone; a second cyclone for separating the first group of small particles and the ball milled third group of large particles into a fourth group of large particles and a second group of small particles; and a stirred mill for milling the fourth group of large particles from the second cyclone and returned to the second cyclone for further separating, wherein the second group of small particles from the second cyclone are sent on for further metal extraction processing.

In a fourteenth aspect, there is provided a system for preparing ore for precious metal extraction comprising: a primary crusher for crushing ore; a first screen for screening the crushed ore into a first group of large ore particles, a group of middle ore particles, and a first group of fines particles; a bulk sorter for sorting the first group of large ore particles to eliminate waste particles; an ore sorter for sorting the group of middle ore particles to eliminate waste particles; a secondary crusher for crushing the first group of large ore particles from the first screen; a second screen for screening the crushed first group of large ore particles into a second group of large ore particles and a second group of fines particles, the large ore particles sent back to the ore sorter for further sorting; a rolls crusher for crushing the group of middle ore particles and the second group of large ore particles from the ore sorter; a third screen for screening the rolls crushed particles, the first group of fines particles and the second group of fines particles; a first cyclone for separating the screened particles from the third screen into a third group of large and a first group of small particles; a ball mill for milling the third group of large particles from the first cyclone; a coarse flotation for recovering concentrate from the ball milled third group of large particles; a second cyclone for separating the first group of small particles and the concentrate into a fourth group of large particles and a second group of small particles; and a stirred mill for milling the fourth group of large particles from the second cyclone and returned to the second cyclone for further separating, wherein the second group of small particles from the second cyclone are sent on for further metal extraction processing.

In other aspects of the systems described herein, wherein the primary crusher is selected from the group of a gyratory crusher, a tooth roll sizer, and a jaw crusher. In another aspect, wherein the screen is selected from the group of circle-throw vibrating, high frequency vibrating equipment, gyratory, and trommel screens. In another aspect, wherein the ore sorter comprises sensors. In another aspect, wherein the sensors are selected from the group consisting of X-ray transmission (XRT) sensors, X-ray fluorescence (XRF) sensors, and 3D laser sensors. In another aspect, wherein the ball mill is an open circuit ball mill. In another aspect, wherein the ball milled third group of large particles is sent back to the first cyclone for further separating, putting the ball mill in a closed circuit ball mill. In another aspect, wherein the primary crusher crushes ore to a size range of about 1000 mm to about 200 mm. In another aspect, wherein the second group of large particles has a size range of about 50 mm to about 30 mm and the second group of fines particles has a size range of about 15 mm to about 6 mm. In another aspect, wherein the third group of large particles has a size range of about 30 mm to about 20 mm and the first group of small particles has a size range about 15 mm to about 6 mm. In another aspect, wherein the fourth group of large particles has a size range of about 20 mm to about 10 mm and the second group of small particles has a size range of less than about 10 mm. In another aspect, wherein the first group of large particles has a size range of about 300 mm to about 80 mm, the group of middle particles has a size range of about 80 mm to about 20 mm and the first group of fines particles has a size range of about 15 mm to about 6 mm.

With respect to the system of the eighth aspect, wherein a specific energy consumption is produced in a range of about 18 kWh/t to about 22 kWh/t and an installed energy in a range of about 43 MW to about 48 MW. With respect to the system of the ninth aspect, wherein a specific energy consumption is produced in a range of about 16.5 kWh/t to about 19 kWh/t, an installed energy in a range of about 38 MW to about 43 MW, and a specific energy reduction of about −12% to about −18% when compared to the system of the eighth aspect. With respect to the system of the tenth aspect, wherein a specific energy consumption is produced in a range of about 13.1 kWh/t to about 14.5 kWh/t, an installed energy in a range of about 32 MW to about 36 MW, and a specific energy reduction of about −28% to about −33% when compared to the system of the eighth aspect. With respect to the system of the eleventh aspect, wherein a specific energy consumption is produced in a range of about 12.5 kWh/t to about 14 kWh/t, an installed energy in a range of about 31 MW to about 35 MW, and a specific energy reduction of about −30% to about −37% when compared to the system of the eighth aspect. With respect to the system of the twelfth aspect, wherein a specific energy consumption is produced in a range of about 9 kWh/t to about 14 kWh/t, an installed energy in a range of about 25 MW to about 30 MW, and a specific energy reduction of about 40% to about −47% when compared to the system of the eighth aspect. With respect to the system of the thirteenth aspect, wherein a specific energy is produced consumption in a range of about 8 kWh/t to about 12 kWh/t, an installed energy in a range of about 23 MW to about 28 MW, and a specific energy reduction of about −50% to about 55% when compared to the system of the eighth aspect. With respect to the system of the fourteenth aspect, wherein a specific energy consumption is produced in a range of about 7 kWh/t to about 10 kWh/t, an installed energy in a range of about 20 MW to about 25 MW, and a specific energy reduction of about −55% to about 60% when compared to the system of the eighth aspect.

In another aspect, there is provided a system and a method for preparing ore for precious metal extraction that includes ore sorting, rolls crushing, classification prior to an open circuit ball milling with stirred mill finish.

In another aspect, there is provided a system and a method for preparing ore for precious metal extraction that includes bulk sorting and sensor based ore sorting as ore sorting methods.

In another aspect, there is provided a system and a method for preparing ore for precious metal extraction that includes coarse flotation.

The aspects described above can be combined in any suitable combination.

Other features and advantages of the present disclosure will become apparent from the following detailed description. It should be understood, however, that the detailed description and the specific examples while indicating embodiments of the disclosure are given by way of illustration only, since various changes and modifications within the spirit and scope of the disclosure will become apparent to those skilled in the art from the detailed description.

BRIEF DESCRIPTION OF THE DRAWINGS

Embodiments will now be described, by way of example only, with reference to the accompanying drawings, where like reference numerals indicate like parts. The skilled person in the art will understand that the drawings, described below, are for illustration purposes only.

DETAILED DESCRIPTION OF THE PREFERRED EMBODIMENT

Figure 1:
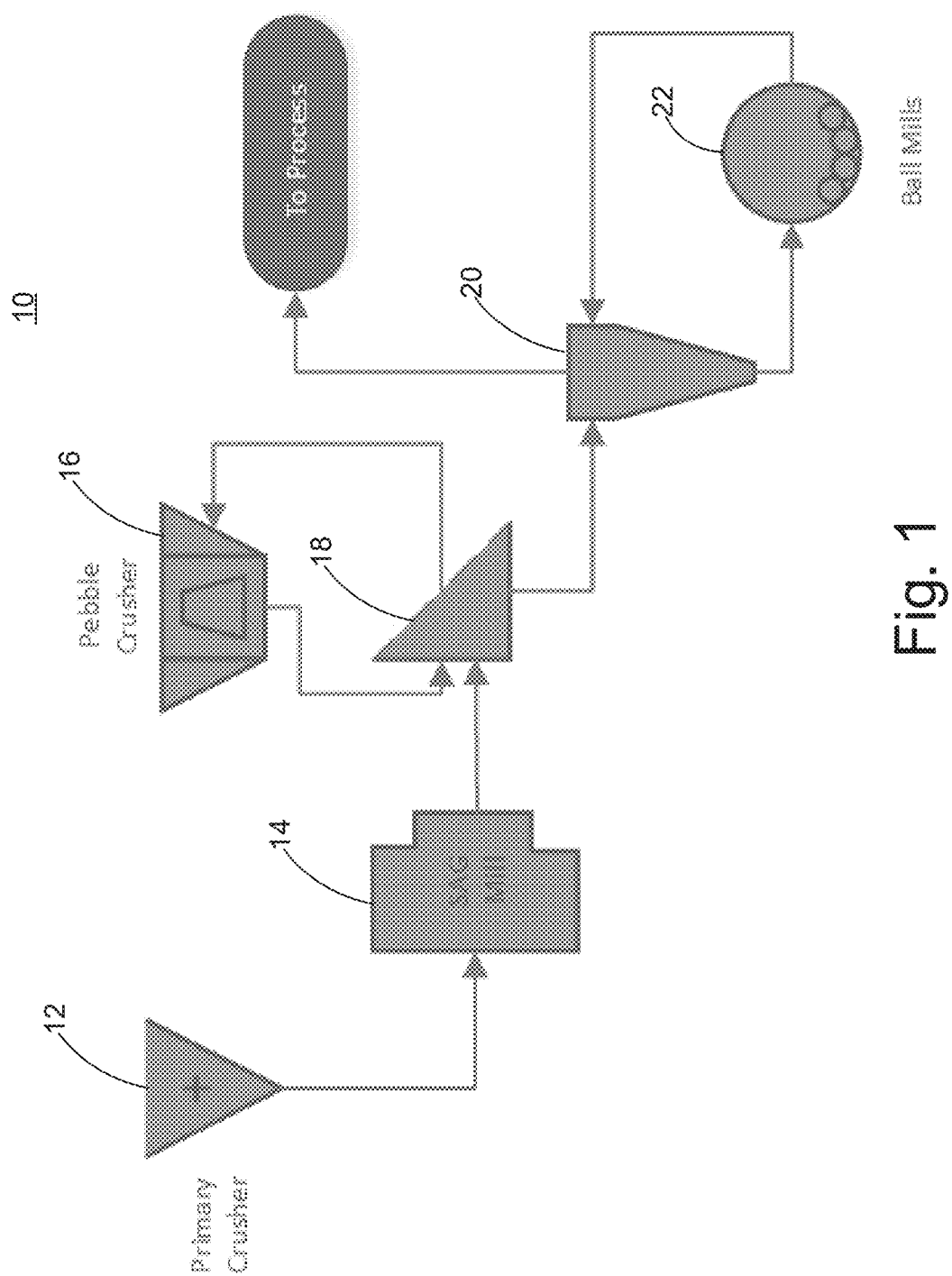
FIG. 1 is an exemplary process flow for mineralized ore.

Reference is first made to FIG. 1 which shows an exemplary process for separating metal from mineralized ore and is generally referenced by the numeral 10. Process 10 depicts a semi-autogenous grinding (SAG) mill, ball mill, pebble crusher (SABC) circuit. In this process 10, a primary crusher 12, SAG mill 14, pebble crusher 16, screen 18, cyclone 20, and ball mill 22 is used.

In operation, raw material of various size is usually delivered to the primary crusher's 12 hopper. Primary crushing reduces the large pieces to a size which can be handled by the downstream machinery. Primary crusher 12 is chosen to provide a suitable crushing ratio for the size of raw material to be crushed, the production rate, and the desired product output size. A typical example of primary crushing is reducing the ore to a particle size that is less than about 1000 mm and more typically, from about 1000 mm to about 200 mm. Primary crusher 12 may be chosen from, but is not limited to, a gyratory crusher, tooth roll sizers (e.g. direct drive crusher (DDC)-sizers), or a jaw crusher.

Material from the primary crusher 12 is delivered to the SAG mill 14. SAG mills are semi-autogenous mills that utilize steel balls in addition to large rocks for grinding. Attrition between grinding balls and ore particles causes grinding of finer particles of less than about 10 mm and more typically, particle sizes of about 10 mm to about 3 mm. The inside of the mill is lined with lifting plates to lift the material inside the mill, where it then falls off the plates onto the rest of the ore charge. SAG mills are typically used at gold, copper and platinum mines with applications also in the lead, zinc, silver, alumina and nickel industries.

From the SAG mill 14, material is passed through a screen 18. Screening type may be, but is not limited to, circle-throw vibrating, high frequency vibrating equipment, gyratory, and trommel screens. Screen 18 separates particles into a large and small group of particles. The large group of particles having a size of about 100 mm, more typically from about 100 mm to 50 mm. The small group of particles having a size of less than about 10 mm. From the screen 18, the larger material may be passed through a pebble crusher 16 for further processing and sent back to the screen 18.

Material is then passed to the cyclone 20. A cyclone is a mechanical device designed to reduce or increase the concentration of a dispersed phase, solid, liquid or gas of different density, by means of centripetal forces or centrifugal forces within a vortex. Cyclones are used extensively both to classify particles for recirculation in grinding circuits and to differentiate between the acceptable material for downstream processing and material that requires additional milling. The material passed on for downstream processing has a size of about 10 mm or less. The material requiring additional milling has a size of about 30 mm, and more typically, a size range of about 30 mm to 20 mm.

Material requiring additional milling is passed to at least one ball mill 22. The number of ball mills used in a circuit may depend on the characteristics of the ore being processed and/or the size of the mill and the desired maximum throughput. In typical embodiments, the number of mills relates to tonnage and hardness. For example, the method described herein can be directed to a nominal 50,000 tpd hard rock application and specific throughput will vary based on material type, breakage function and desired liberation.

A ball mill consists of a hollow cylindrical shell rotating about its axis. The shell is partially filled with balls. The grinding media is the balls, which may be made of steel (or alloys of chrome and steel), stainless steel, ceramic, rubber, or pebbles of greater hardness than the ore being milled. From the ball mill 22, material is passed back to the cyclone 20 for further sorting into material that is passed downstream for further processing or material that will require additional milling. The material passed on for downstream processing has a size of about 10 mm or less. The material requiring additional milling has a size of about 20 mm, and more typically, a size range of about 20 mm to 10 mm.

As an illustrative example, process 10 is used to process ore with moderate hardness of A×b of about 40 and BWi of about 13.2 kWh/t. A 40'×22' SAG mill 14 is used with two 24'×36' ball mills. In this case, about 20.0 kWh/t energy consumption occurs with an installed energy of about 46 MW. More typically, an energy consumption range of about 18 kWh/t to about 22 kWh/t and an installed energy range of about 43 MW to about 48 MW occurs.

Figure 2:
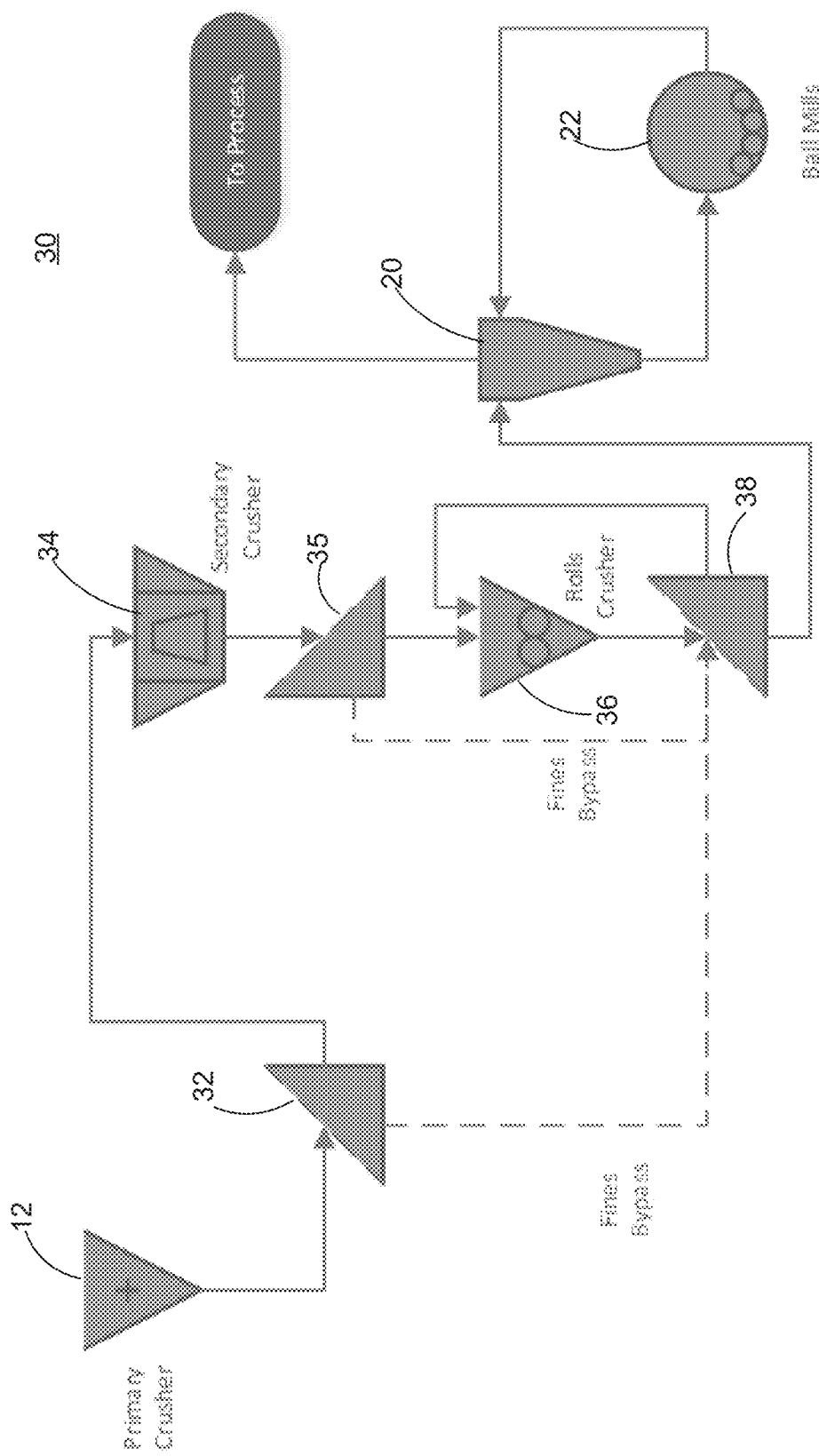
FIG. 2 is another embodiment of a process flow for mineralized ore.

FIG. 2 shows another embodiment of an exemplary process for separating metal from mineralized ore and is generally referenced by the numeral 30. Process 30 has a primary crusher 12, a first or primary crusher screen 32, a secondary crusher 34, a second or secondary crusher screen 35, a rolls crusher 36, a third or rolls crusher product screen 38, a cyclone 20, and at least one ball mill 22. Specifically, process 30 replaces the SAG mill 14 and pebble crusher 16 process 10 with an open-circuit secondary crusher 34 and a large-diameter rolls crusher 36.

In operation, raw material is delivered to the primary crusher 12. The crushed material is passed to a first screen 32 for separating the material by size into larger material that gets passed on to a secondary crusher 34 and smaller or fines material that is passed on to the rolls product screen 38. The first screen 34 passes to the secondary crusher 34 larger material of a size of about 100 mm, but more typically of a size range of 100 mm to about 50 mm. Fines material is usually of a size range of about 15 mm or less, more typically of a size range of about 15 mm to about 6 mm. Secondary crusher 34 reduces material from the primary crusher screen 32 into smaller desired particles. A typical example of secondary crushing may reduce the particle size from about 200 mm to about 20 mm, more typically, about 200 mm to about 50 mm. Secondary crusher 34 may be, but is not limited to, a cone crusher, a rolls crusher, an impact crusher, a hammer mill, and a toothed sizer (e.g. direct drive crusher (DDC)-sizers).

From the secondary crusher 34, material is passed to a secondary crusher screen 35. Larger material from the secondary crusher screen 35 is then passed to rolls crusher 36. Smaller or fines material from the secondary crusher screen 35 is passed onto rolls crusher screen 38. Larger material from the secondary crusher screen has a typical size range of about 50 mm to about 30 mm. Fines material from the secondary crusher screen typically has a range of about 15 mm to about 6 mm. A rolls crusher 36 utilizes two rolls rotating about a shaft, towards the gap between the rolls. The gap between the rolls is set to the size of product desired. The material is passed from the rolls crusher 36 to a rolls crusher product screen 38.

Primary crusher screen 32 and secondary crusher screen 35 utilize fines bypass, where fine particles are passed to later stages of the process. Fine material or fine particles are of a size less than about 15 mm, more typically, less than about 6 mm. This bypassing of fine material allows the fines to pass directly through subsequent comminution stages and potentially to the final process without being reground. This will limit the formation of slimes and provide improved metallurgical performance in potential downstream processes such as flotation. In the example shown in FIG. 2, the fine material from primary crusher screen 32 and secondary crusher screen 35 is passed directly to rolls crusher screen 38.

From the rolls crusher product screen 38, smaller screened material is passed to the cyclone 20. Larger screened material from the rolls crusher product screen 38 is passed back to the rolls crusher 36 for further crushing. Smaller screened material from the rolls crusher product screen 38 is typically of a range of less than about 15 mm, more typically having a range of about 15 mm to about 6 mm. Larger screened material from the rolls crusher product screen 38 having a range of about 30 mm to about 20 mm.

Smaller screened material from the rolls crusher screen 38 is passed from the cyclone 20 onto further processing. The cyclone separates the material into material that requires additional milling and material that is passed on for downstream processing. Material requiring additional milling having a size range of about 20 mm to about 10 mm and is passed to at least one ball mill 22. Material that is passed on for downstream processing typically having a size range of less than about 10 mm.

As described above with respect to FIG. 1, a cyclone 20 (or hydrocyclone) is a mechanical device designed to classify, separate or sort particles in a liquid suspension based on the ratio of their centripetal force to fluid resistance. This ratio is high for dense and coarse particles, and low for light and fine particles. Particles of less than about 500 μm proceed to the cyclone overflow and particles of greater than about 500 μm proceed to the cyclone underflow. The mixture is injected into the cyclone in such a way as to create the vortex and, depending upon the relative densities of the two phases, the centrifugal acceleration will cause the dispersed phase to move away from or towards the central core of the vortex. A cyclone will normally have a cylindrical section at the top where liquid is being fed tangentially, and a conical base. The angle, and hence length of the conical section, plays a role in determining operating characteristics.

By placing the cyclone 20 on the rolls crusher screen 38 stream, there is direct classification and splitting of material according to the process, which provides a more energy-efficient process for its particular size range.

As an illustrative example, in process 30, two 1250 HP secondary crushers, a 2.6 m ø rolls crusher, and two 26'×40.5' ball mill are utilized to process ore with moderate hardness of A×b of about 40 and BWi of about 13.2 kWh/t. A specific energy consumption of about 17.9 kWh/t occurs with about 2 MW for conveyors, and an installed energy of about 41 MW. More typically, an energy consumption range of about 16.5 kWh/t to about 19 kWh/t and an installed energy range of about 38 MW to about 43 MW occurs. In this example, a specific energy reduction of about −16% compared to process 10 occurs. Typically, the specific energy reduction of about −12% to about −18%.

Figure 3:
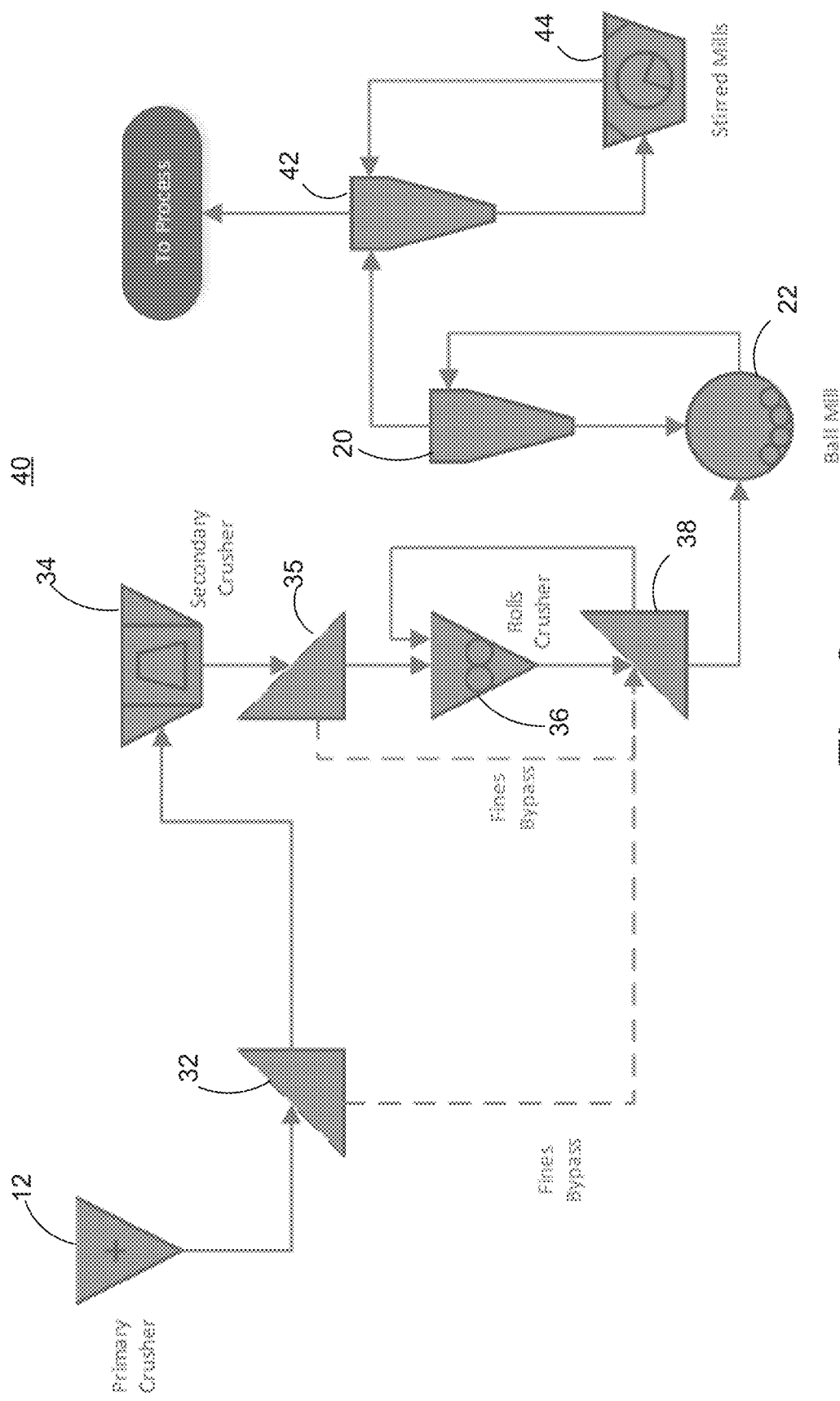
FIG. 3 is another embodiment of a process flow for mineralized ore.

FIG. 3 shows another embodiment of an exemplary process for separating metal from mineralized ore and is generally referenced by the numeral 40. Process 40 follows process 30 until the final grinding stage where after the cyclone 20 a second cyclone 42 and a stirred mill 44 are added. While one stirred mill 44 is shown in the diagram, there may be a plurality of stirred mills, placed in parallel or series, utilized in the circuit. Typically, the number of stirred mills would be dictated by total energy required for size reduction to the final grind size, which may be determined by the desired liberation for a particular mineralized ore.

Acceptable material from cyclone 20 passes to the second cyclone 42. This smaller acceptable material may be of a size range of about 15 mm to about 6 mm. Material requiring additional milling from second cyclone 42 is passed to stirred mills 44 for further grinding and passed back to the second cyclone 42. Material requiring additional milling is usually of a size range of about 30 mm to about 20 mm. Size ranges of particles may be predicated by downstream processing needs; for example, P80 of about 90 microns (about 80% of particles finer than about 90 microns).

The stirred mills 44 are configured in a reverse closed circuit so that material that is finer than the targeted final grind size would pass directly to the downstream without being further reground. In a typical stirred mill, a grinding chamber is filled with small grinding media (e.g. small beads) whereby comminution takes place by attrition between the beads. The stirring effect can be caused by rotating discs mounted on a shaft or a rotating auger which mobilizes the grinding media. There are also stationary discs on the mill body positioned in between each rotational disc. Acceptable material from the second cyclone 42 is passed on for further processing to extract desired metals.

As an illustrative example, to process ore with moderate hardness of A×b of about 40 and BWi of about 13.2 kWh/t, in process 40, two 1250 HP secondary crushers, one 2.6 m Ø rolls crusher, one 24'×36' ball mill, and four 4500 HP stirred mills are utilized. About 13.8 kWh/t specific energy consumption occurs, which includes about 2 MW for conveyors. More typically, a specific energy consumption range of about 13.1 kWh/t to about 14.5 kWh/t occurs. About 34 MW installed energy occurs. More typically, an installed range of about 32 MW to about 36 MW occurs. A specific energy reduction of about −31% compared to process 10 also occurs for this configuration. Typically, the specific energy reduction of about −28% to about −33%.

Figure 4:
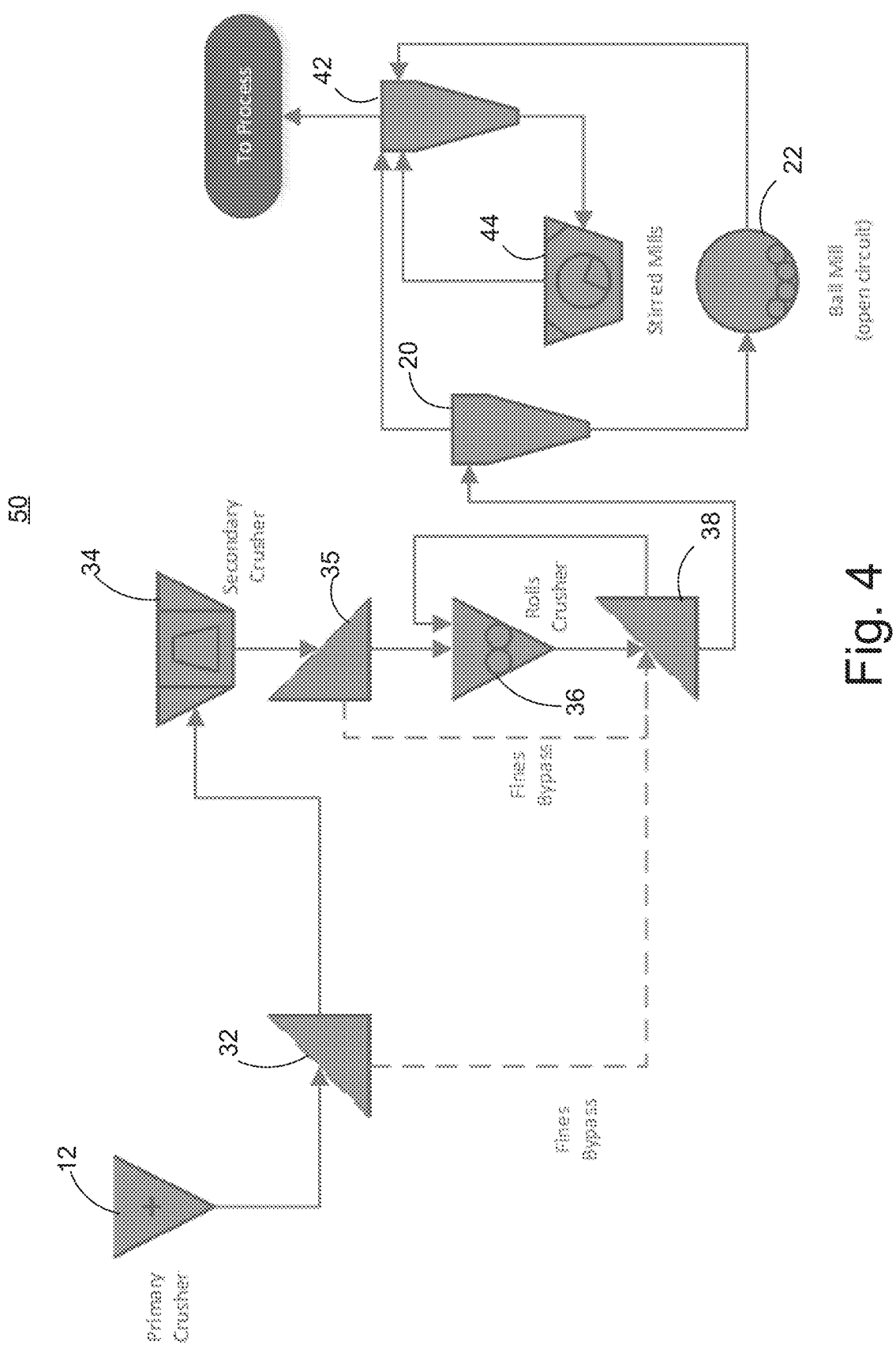
FIG. 4 is another embodiment of a process flow for mineralized ore.

FIG. 4 shows another embodiment of an exemplary process for separating metal from mineralized ore and is generally referenced by the numeral 50. Unlike process 40, in process 50, the undersize from the rolls crusher screen 38 is fed to cyclone 20 that splits the product between an open-circuit ball mill 22 (cyclone underflow) and stirred mill closed circuit (cyclone overflow). Process 50 follows process 40 until the final grinding stage where the ball mill 22 is placed in an open circuit. Specifically, after the rolls crusher screen 38, the material passes to cyclone 20 for separation. Material requiring additional handling, typically of a size range of about 30 mm to about 20 mm, passes to the ball mill 22 which then passes to second cyclone 42 and on to further processing. Acceptable material from cyclone 20, typically of a size range of about 15 mm to about 6 mm, is passed to second cyclone 42. Material separated in second cyclone 42 that requires further treating is passed to stirred mills 44 in a closed circuit. Material that requires further treating from the second cyclone 42 is typically of a range of about 20 mm to about 10 mm. Having the ball mill 22 in an open circuit allows for energy savings and a further reduction in size of the ball mill.

As an example, if in process 50, two 1250 HP secondary crushers, one 2.6 m ø rolls crusher, one 22'×34' ball mill, and four 4500 HP stirred mills are utilized, about 13.3 kWh/t specific energy consumption occurs, which includes about 2 MW for conveyors. More typically, a specific energy consumption range of about 12.5 kWh/t to about 14 kWh/t occurs. About 33 MW installed energy occurs. More typically, an installed energy range of about 31 MW to about 35 MW occurs. A specific energy reduction of about −34% compared to process 10 occurs for this configuration. Typically, the specific energy reduction of about −30% to about −37%.

Figure 5:
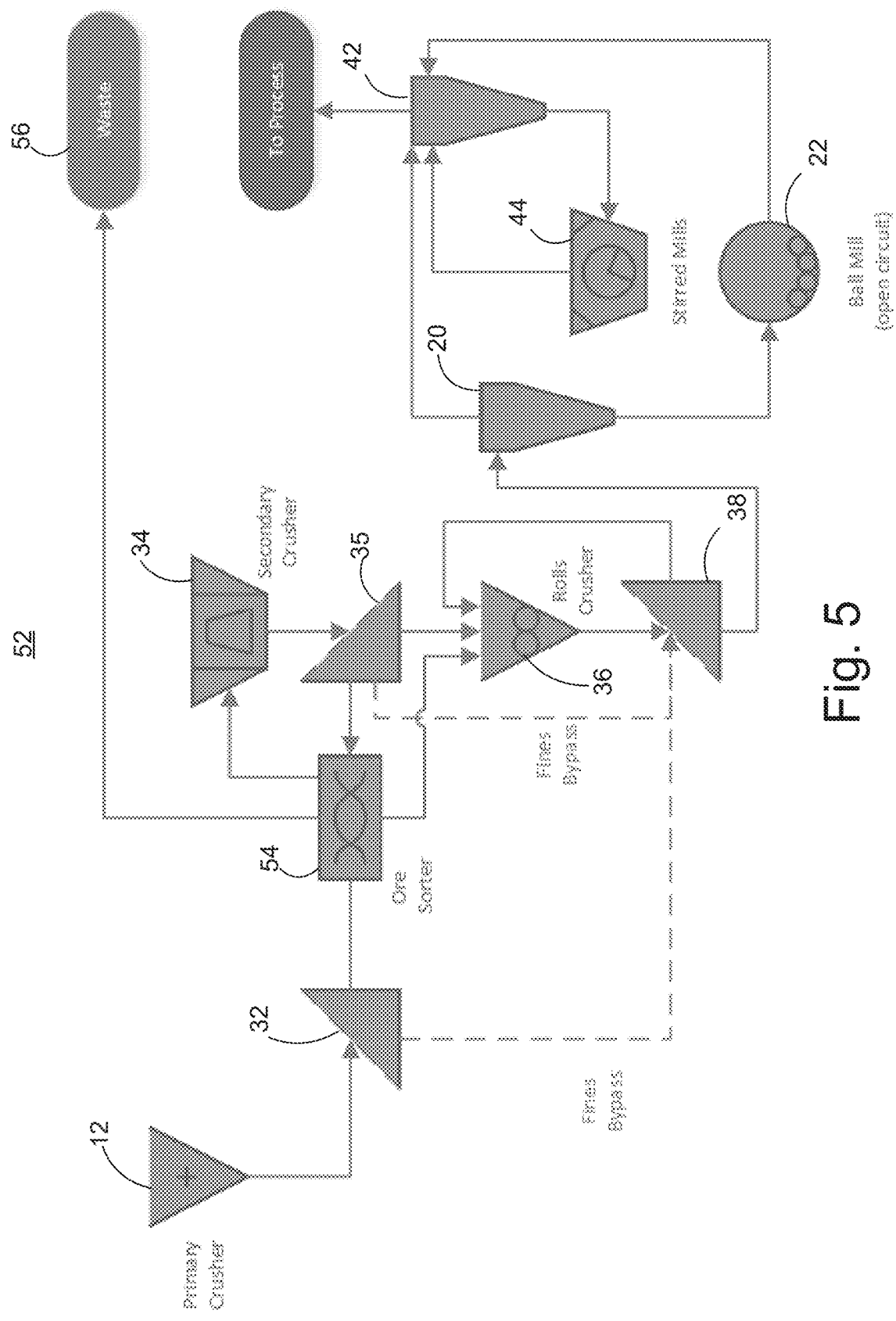
FIG. 5 is another embodiment of a process flow for mineralized ore.

FIG. 5 shows another embodiment of an exemplary process for separating metal from mineralized ore and is generally referenced by the numeral 52. Process 52 follows process 50 except after the primary crusher screen 32, material is passed to an ore sorter 54. Similarly, after secondary crusher screen 35, material is passed to the ore sorter 54 and to the rolls crusher 36. Typically, material that is greater than about 20 mm is passed to the ore sorter. From the ore sorter, the material is sorted as either waste 56 or is passed on to the rolls crusher 36.

Ore sorting is separating an ore into constituent parts. Ores are sorted to increase the efficiency of other refining processes, by reducing, for example, the amount of material to be processed while simultaneously increasing its purity. Ore sorter 54 may be a sensor-based ore sorter. Sensor-based ore sorting allows for the rejection of waste material and avoids the use of energy required for comminution. As part of the illustrative example, it is assumed that less than about 30%, typically about 10% to about 20% of the feed to the process 52 will be rejected as waste 56 by the ore sorter 54.

Ore sorter 54 uses sensors (not shown) to sort low-grade waste material from the ore. Then the ore may be treated and waste 56 which is removed from the process. Sorting may be carried out on streams from primary crusher screen 32 and secondary crusher screen 35. The sensors may be, but are not limited to X-ray transmission (XRT) sensors, X-ray fluorescence (XRF) sensors, or 3D laser sensors.

As an illustrative example, to process ore with moderate hardness of A×b of about 40 and BWi of about 13.2 kWh/t using process 52, two 1250 HP secondary crushers, one 2.6 m Ø rolls crusher, one 20'×32' ball mill, three 4500 HP stirred mills are utilized. About 11.5 kWh/t specific energy consumption occurs, which includes about 2 MW for conveyors and about 2 MW for sorting. More typically, a specific energy range of about 9 kWh/t to about 14 kWh/t occurs. About 28 MW installed energy also occurs. More typically, an installed energy range of about 25 MW to about 30 MW occurs. A specific energy reduction of about −43% compared to process 10 also occurs. Typically, the specific energy reduction of about −40% to about −47%.

Figure 6:
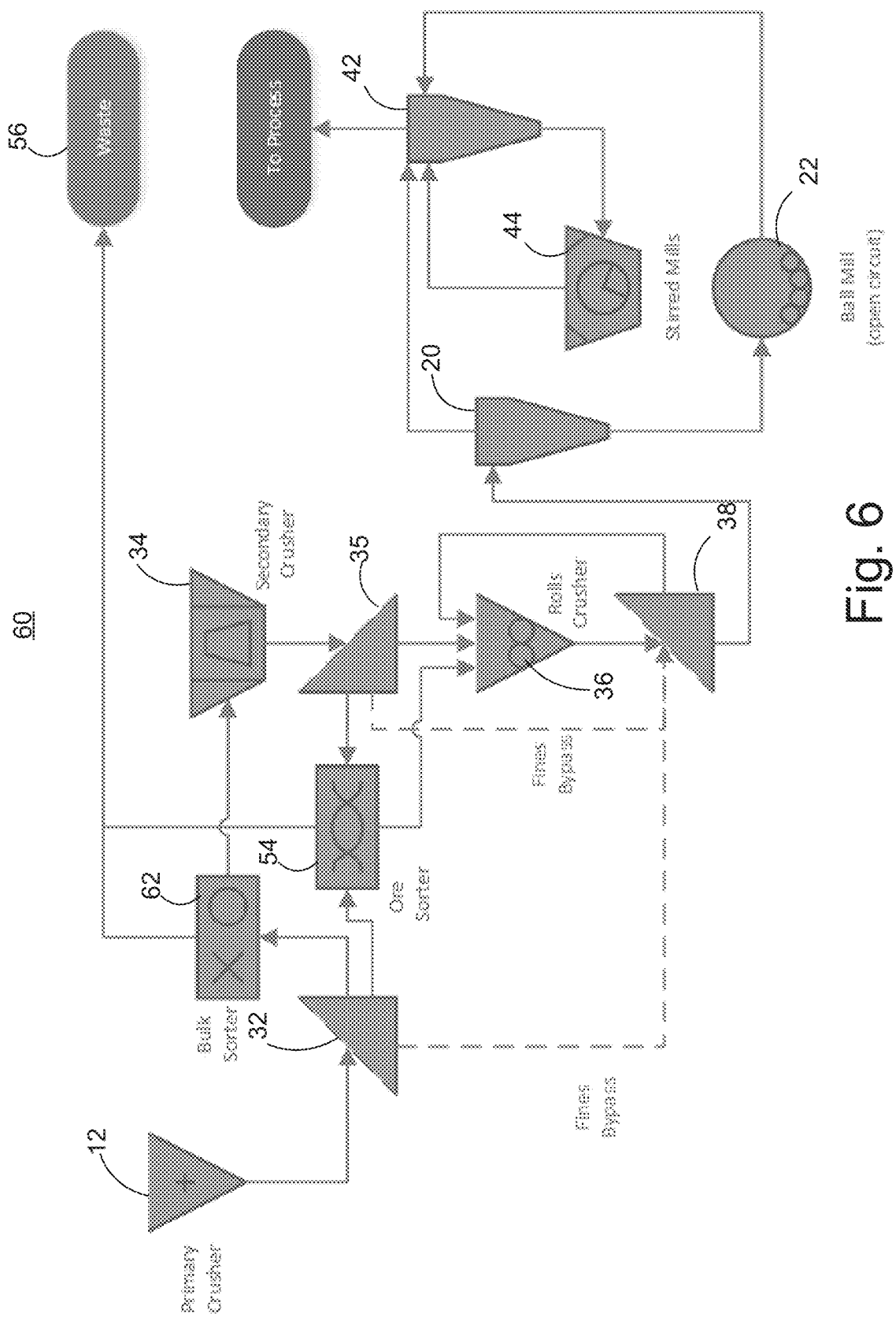
FIG. 6 is another embodiment of a process flow for mineralized ore.

FIG. 6 shows another embodiment of an exemplary process for separating metal from mineralized ore and is generally referenced by the numeral 60. Process 60 follows process 52 except after the after the primary crusher screen 32, material is passed to bulk sorter 62 and ore sorter 54. Typically, material less than about 80 mm would go to the ore sorter and more typically, material of about 20 mm to about 80 mm would go to the ore sorter. Typically, material greater than about 80 mm would go to the bulk sorter. More typically, the material that would go to the bulk sorter would have a range of 300 mm to about 80 mm. A further waste reduction could be possible by using a bulk sorter 62 on the coarse fraction from the primary crusher screen 32.

Use of bulk sorting on the coarse fraction from the primary crusher screen 32 allows for the rejection of waste material while avoiding energy expenditure required for comminution. Conveyor-based sorting technology could employ multiple sensors including X-ray transmission (XRT) and 3D laser and sorting algorithms to reject low-value waste material. As part of the illustrative example, it is assumed that a further about 20% of the feed to process 60 will be rejected as waste by the bulk sorter 62. Waste 56 rejected from the process 60 can also reduce overall energy required for comminution. Acceptable material from bulk sorter 62 is passed to the secondary crusher. Process 60 then follows process 52.

As an illustrative example, to process ore with moderate hardness of A×b of about 40 and BWi of about 13.2 kWh/t using process 60, two 1250 HP secondary crushers, one 2.6 m ø rolls crusher, one 18'×32' ball mill, and three 4500 HP stirred mills are utilized. About 9.5 kWh/t specific energy consumption occurs, which includes about 2 MW for conveyors and about 3 MW for sorting. More typically, a specific energy consumption range of about 8 kWh/t to about 12 kWh/t occurs. About 26 MW installed energy is also expected. More typically, an installed energy range of about 23 MW to about 28 MW occurs. A specific energy reduction of about −52% compared to process 10 also occurs. Typically, the specific energy reduction of about −50% to about −55%.

Figure 7:
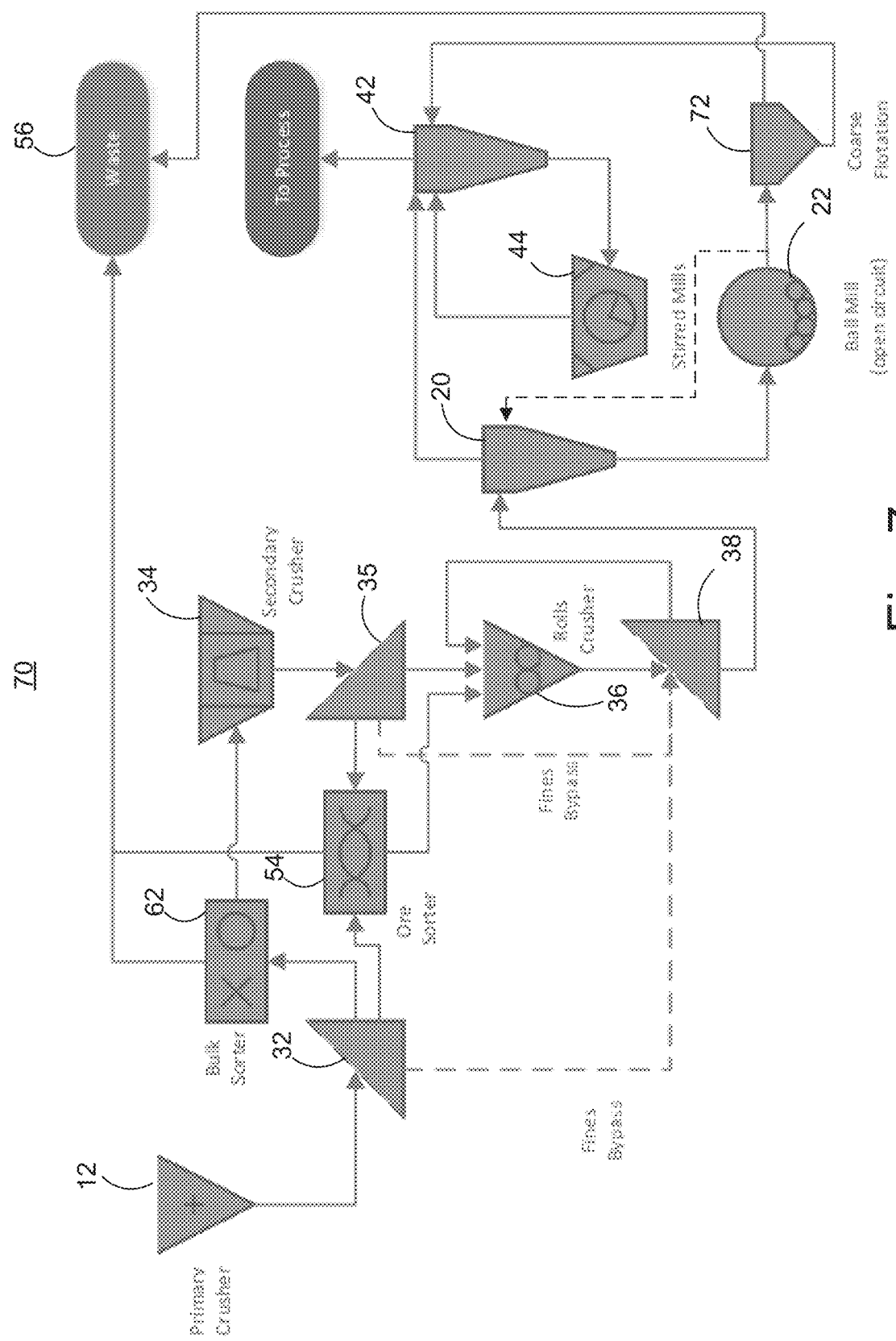
FIG. 7 is another embodiment of a process flow for mineralized ore.

FIG. 7 shows another embodiment of an exemplary process for separating metal from mineralized ore and is generally referenced by the numeral 70. Process 70 follows process 60 until the final grinding stage where coarse flotation 72 is used on the material from the open circuit ball mill 22. Process 70 is well-suited for coarse flotation as it contains minimal fines having a top size of less than about 0.5 mm. Concentrate from the coarse flotation 72 could proceed to the second cyclone 42 and the stirred mill 44 while the tails could be a waste product. As part of the illustrative example, it is assumed that a further about 20% of the feed to the circuit will be rejected as waste by the coarse flotation. In another embodiment of process 70, material from ball mill 22 may proceed to cyclone 20, as indicated by the dotted line from ball mill 22 to cyclone 20, putting the ball mill 22 in a closed circuit configuration for certain amenable ore types.

As an illustrative example, using process 70 to process ore with moderate hardness of A×b of 40 and BWi of 13.2 kWh/t, two 1250 HP secondary crushers, one 2.6 m Ø rolls crusher, one 18'×32' ball mill, and two 4500 HP stirred mills are utilized. About 8.8 kWh/t specific energy consumption occurs, which includes about 2 MW for conveyors and about 3 MW for sorting. More typically, a specific energy consumption range of about 7 kWh/t to about 10 kWh/t occurs. About 23 MW installed energy is also expected. More typically, an installed energy range of about 20 MW to about 25 MW occurs. A specific energy reduction of about −56% compared to process 10 occurs for this configuration. Typically, the specific energy reduction of about −55% to about −60%.

As one skilled in the art can appreciate, all of the calculated ranges used in the description can have a range of ±5% size specific energy.

In embodiments, the process/method can be used with any mineralized ore and it may be used to extract any suitable metal. The metal(s) may be selected from, for example, precious metals, transition metals, and rare-earth metals. The metal may be selected from the group consisting of gold, silver, rhenium, ruthenium, rhodium, palladium, osmium, iridium, platinum, copper, nickel and combinations thereof. More specifically, the metal may be gold, silver, platinum, copper, and/or nickel and in particular, in gold recovery from mineralized ores.

In understanding the scope of the present application, the articles "a", "an", "the", and "said" are intended to mean that there are one or more of the elements, unless specifically stated otherwise. The use of "or" means "and/or", unless specifically stated otherwise. Additionally, the term "comprising" and its derivatives, as used herein, are intended to be open ended terms that specify the presence of the stated features, elements, cores, groups, integers, and/or steps, but do not exclude the presence of other unstated features, elements, cores, groups, integers and/or steps. The foregoing also applies to words having similar meanings such as the terms, "including", "having" and their derivatives.

It will be understood that any aspects described as "comprising" may also "consist of" or "consist essentially of," wherein "consisting of" has a closed-ended or restrictive meaning and "consisting essentially of" means including the components or steps specified but excluding other components or steps except for materials present as impurities, unavoidable materials present as a result of processes, and components added for a purpose other than achieving the technical effect of the disclosure.

It will be understood that any feature defined herein as being included may be explicitly excluded from the claimed disclosure by way of proviso or negative limitation.

In addition, all ranges given herein include the end of the ranges and also any intermediate range points, whether explicitly stated or not.

Finally, terms of degree such as "substantially", "about", "significantly" and "approximately" as used herein mean a reasonable amount of deviation of the modified term such that the end result is not majorly changed. These terms of degree should be construed as including a deviation of ±5% of the modified term if this deviation would not negate the meaning of the word it modifies.

It is to be understood that the foregoing is exemplary and explanatory only, and it is to be understood that such detail is solely for that purpose and that the disclosure is not limited to the disclosed embodiments, but, on the contrary, is intended to cover modifications and equivalent arrangements that are within the spirit and scope of the appended claims. As an example, it is to be understood that the present disclosure contemplates that, to the extent possible, one or more features of any embodiment can be combined with one or more features of any other embodiment.

What is claimed is:

1. A system for preparing ore for precious metal extraction comprising:
   a primary crusher for crushing ore;
   a first screen for screening the crushed ore into a first group of large ore particles and a first group of fines particles;

a secondary crusher for crushing the first group of large ore particles from the first screen;
a second screen for screening the crushed first group of large ore particles into a second group of large ore particles and a second group of fines particles;
a rolls crusher for crushing the second group of large ore particles;
a third screen for screening the rolls crushed second group of large ore particles, the first group of fines particles and the second group of fines particles, wherein the first group of fines particles is passed directly to the third screen from the first screen, and the second group of fines particles is passed directly to the third screen from the second screen;
a cyclone for separating the screened particles from the third screen into a third group of large particles and small particles;
a ball mill for milling the third group of large particles from the cyclone,
wherein the milled third group of large particles are sent back to the cyclone for further separating and wherein the small particles from the cyclone are sent on for further metal extraction processing.

2. The system of claim 1, wherein the primary crusher is selected from the group of a gyratory crusher, a tooth roll sizer, and a jaw crusher.

3. The system of claim 1, wherein the secondary crusher is a pebble crusher.

4. The system of claim 1, wherein each of the first, second, and third screens is selected from the group of circle-throw vibrating, high frequency vibrating equipment, gyratory, and trommel screens.

5. The system of claim 1, wherein the ball mill is an open circuit ball mill.

6. The system of claim 1, wherein the primary crusher crushes ore to a size range of 1000 mm to 200 mm.

7. The system of claim 1, wherein the first group of large ore particles has a size range of 100 mm to 50 mm and the small particles have a size range of less than 10 mm.

8. The system of claim 1, wherein the second group of large ore particles has a size range of 50 mm to 30 mm.

9. The system of claim 1, wherein the second group of large ore particles has a size range of 50 mm to 30 mm and the second group of fines particles has a size range of 15 mm to 6 mm.

10. The system of claim 1, wherein the third group of large particles has a size range of 30 mm to 20 mm.

11. The system of claim 1, wherein the first group of large ore particles has a size range of 100 mm to 50 mm and the first group of fines particles has a size range of 15 mm to 6 mm.

12. The system of claim 1, wherein the second group of large ore particles has a size range of 50 mm to 30 mm and the second group of fines particles has a size range of 15 mm to 6 mm.

13. The system of claim 1, wherein the third group of large particles has a size range of 30 mm to 20 mm and the small particles have a size range of 15 mm to 6 mm.

14. The system of claim 1, wherein a specific energy consumption is produced in a range of 18 kWh/t to 22 kWh/t and an installed energy in a range of 43 MW to 48 MW.

15. The system of claim 1, wherein a specific energy consumption is produced in a range of 16.5 kWh/t to 19 kWh/t, an installed energy in a range of 38 MW to 43 MW, and a specific energy reduction of −12% to −18% when compared to another system comprising:
another primary crusher for crushing ore;
a SAG mill for grinding the crushed ore;
another screen for screening ground ore into a first group of large particles and a first group of small particles;
another secondary crusher for crushing large particles from the another screen, the crushed ore from the another secondary crusher passed on to the another screen for separating into a second group of large particles and a second group of small particles;
another cyclone for separating the second group of small particles from the another screen into a third group of large particles and a third group of small particles; and
another ball mill for milling the third group of particles from the another cyclone, the milled particles fed into the another cyclone for separating into a fourth group of large particles and a fourth group of small particles,
wherein the third and the fourth group of small particles from the another cyclone are sent for further metal extraction processing.

16. A system for preparing ore for precious metal extraction comprising:
a primary crusher for crushing ore;
a first screen for screening the crushed ore into a first group of large ore particles and a first group of fines particles;
a secondary crusher for crushing the first group of large ore particles from the first screen;
a second screen for screening the crushed first group of large ore particles into a second group of large ore particles and a second group of fines particles;
a rolls crusher for crushing the second group of large ore particles;
a third screen for screening the rolls crushed second group of large ore particles, the first group of fines particles and the second group of fines particles, wherein the first group of fines particles is passed directly to the third screen from the first screen, and the second group of fines particles is passed directly to the third screen from the second screen;
a ball mill for milling the screened particles from the third screen;
a first cyclone for separating the screened particles from the third screen into a third group of large particles and a first group of small particles, the third group of large particles returned to the ball mill for milling and then returned to the first cyclone for further separating;
a second cyclone for separating the first group of small particles from the first cyclone into a fourth group of large particles and a second group of small particles; and
a stirred mill for milling the fourth group of large particles from the second cyclone and returning the milled fourth group of large particles to the second cyclone for further separating,
wherein the second group of small particles from the second cyclone are sent on for further metal extraction processing.

17. The system of claim 16, wherein a specific energy consumption is produced in a range of 13.1 kWh/t to 14.5 kWh/t, an installed energy in a range of 32 MW to 36 MW, and a specific energy reduction of −28% to −33% when compared to another system comprising:
another primary crusher for crushing ore;
a SAG mill for grinding the crushed ore;
another screen for screening ground ore into a first group of large particles and a first group of small particles;
another secondary crusher for crushing large particles from the another screen, the crushed ore from the another secondary crusher passed on to the another screen for separating into a second group of large particles and a second group of small particles;

another cyclone for separating the second group of small particles from the another screen into a third group of large particles and a third group of small particles; and another ball mill for milling the third group of particles from the another cyclone, the milled particles fed into the another cyclone for separating into a fourth group of large particles and a fourth group of small particles, wherein the third and the fourth group of small particles from the another cyclone are sent for further metal extraction processing.

18. The system of claim 16, wherein the primary crusher is selected from the group of a gyratory crusher, a tooth roll sizer, and a jaw crusher.

19. The system of claim 16, wherein the secondary crusher is a pebble crusher.

20. The system of claim 16, wherein each of the first, second, and third screens is selected from the group of circle-throw vibrating, high frequency vibrating equipment, gyratory, and trommel screens.

21. The system of claim 16, wherein the ball mill is an open circuit ball mill.

22. The system of claim 16, wherein the primary crusher crushes ore to a size range of 1000 mm to 200 mm.

23. The system of claim 16, wherein the first group of large ore particles has a size range of 100 mm to 50 mm and the first group of small particles has a size range of less than 10 mm.

24. The system of claim 16, wherein the second group of large ore particles has a size range of 50 mm to 30 mm and the second group of small particles has a size range of less than 10 mm.

25. The system of claim 16, wherein the second group of large ore particles has a size range of 50 mm to 30 mm and the second group of fines particles has a size range of 15 mm to 6 mm.

26. The system of claim 16, wherein the third group of large particles has a size range of 30 mm to 20 mm.

27. The system of claim 16, wherein the fourth group of large particles has a size range of 20 mm to 10 mm.

28. The system of claim 16, wherein the first group of large ore particles has a size range of 100 mm to 50 mm and the first group of fines particles has a size range of 15 mm to 6 mm.

29. The system of claim 16, wherein the second group of large ore particles has a size range of 50 mm to 30 mm and the second group of fines particles has a size range of 15 mm to 6 mm.

30. The system of claim 16, wherein the third group of large particles has a size range of 30 mm to 20 mm and the first group of small particles has a size range of 15 mm to 6 mm.

31. The system of claim 16, wherein the fourth group of large particles has a size range of 20 mm to 10 mm and the second group of small particles has a size range of less than 10 mm.

32. The system of claim 16, wherein a specific energy consumption is produced in a range of 18 kWh/t to 22 kWh/t and an installed energy in a range of 43 MW to 48 MW.

* * * * *